US00RE36056E

United States Patent [19]

Nonami

[11] E

Patent Number: Re. 36,056

[45] Reissued Date of Patent: Jan. 19, 1999

[54] MOBILE TELEPHONE DEVICE WITH LOW POWER CONSUMPTION

[75] Inventor: Takayuki Nonami, Kobe, Japan

[73] Assignee: Mitsubishi Denki Kabushiki Kaisha, Tokyo, Japan

[21] Appl. No.: 130,045

[22] Filed: Sep. 30, 1993

Related U.S. Patent Documents

Reissue of:

[64] Patent No.: 5,054,052
Issued: Oct. 1, 1991
Appl. No.: 376,039
Filed: Jul. 6, 1989

[30] Foreign Application Priority Data

Apr. 3, 1989 [JP] Japan ..... 1-84376

[51] Int. Cl.[6] ..... H04M 11/00

[52] U.S. Cl. ..... 455/403; 455/89; 455/127; 455/343

[58] Field of Search ..... 379/57–59, 61, 379/142, 413; 455/33.1, 76–77, 89, 127, 343, 413; 340/825.44

[56] References Cited

U.S. PATENT DOCUMENTS

| | | | |
|---|---|---|---|
| 4,720,710 | 1/1988 | Akahori et al. | 340/825.44 |
| 4,723,304 | 2/1988 | Maeda | 379/56 |
| 4,731,814 | 3/1988 | Becker et al. | 455/127 |
| 4,747,122 | 5/1988 | Bhagat et al. | 379/57 |
| 4,768,220 | 8/1988 | Yoshihara et al. | 379/58 |
| 4,794,649 | 12/1988 | Fujiwara | 455/343 |
| 5,040,204 | 8/1991 | Sasaki et al. | 379/61 |
| 5,148,473 | 9/1992 | Freeland et al. | 379/57 |
| 5,247,700 | 9/1993 | Wohl et al. | 340/825.44 |

FOREIGN PATENT DOCUMENTS

| | | |
|---|---|---|
| 63-224422 | 9/1988 | Japan . |
| 63-156132 U | 10/1988 | Japan . |
| 64-62036 | 3/1989 | Japan . |
| WO 88/06830 | 7/1988 | WIPO . |

*Primary Examiner*—Kinfe-Michael Negash
*Attorney, Agent, or Firm*—Pennie & Edmonds

[57] ABSTRACT

A mobile telephone device comprises a separate paging signal channel in addition to the conventional transceiver channels which process voice signals. The paging signal channel has a lower power consumption level than the transceiver channels. A power supply control device shuts off power to the conventional transceiver channels when in a standby mode, i.e. when waiting for an incoming call, and applies power to the paging signal channel instead. Therefore, power consumption is reduced in the standby mode and consequently, the operating time of the battery is extended. Power is applied to the transceiver channels during voice communication periods. A calling party's telephone number received in the paging signal channel is stored and displayed. A control unit has the capability of immediately returning the calling party's call from the telephone number so stored and displayed.

120 Claims, 13 Drawing Sheets

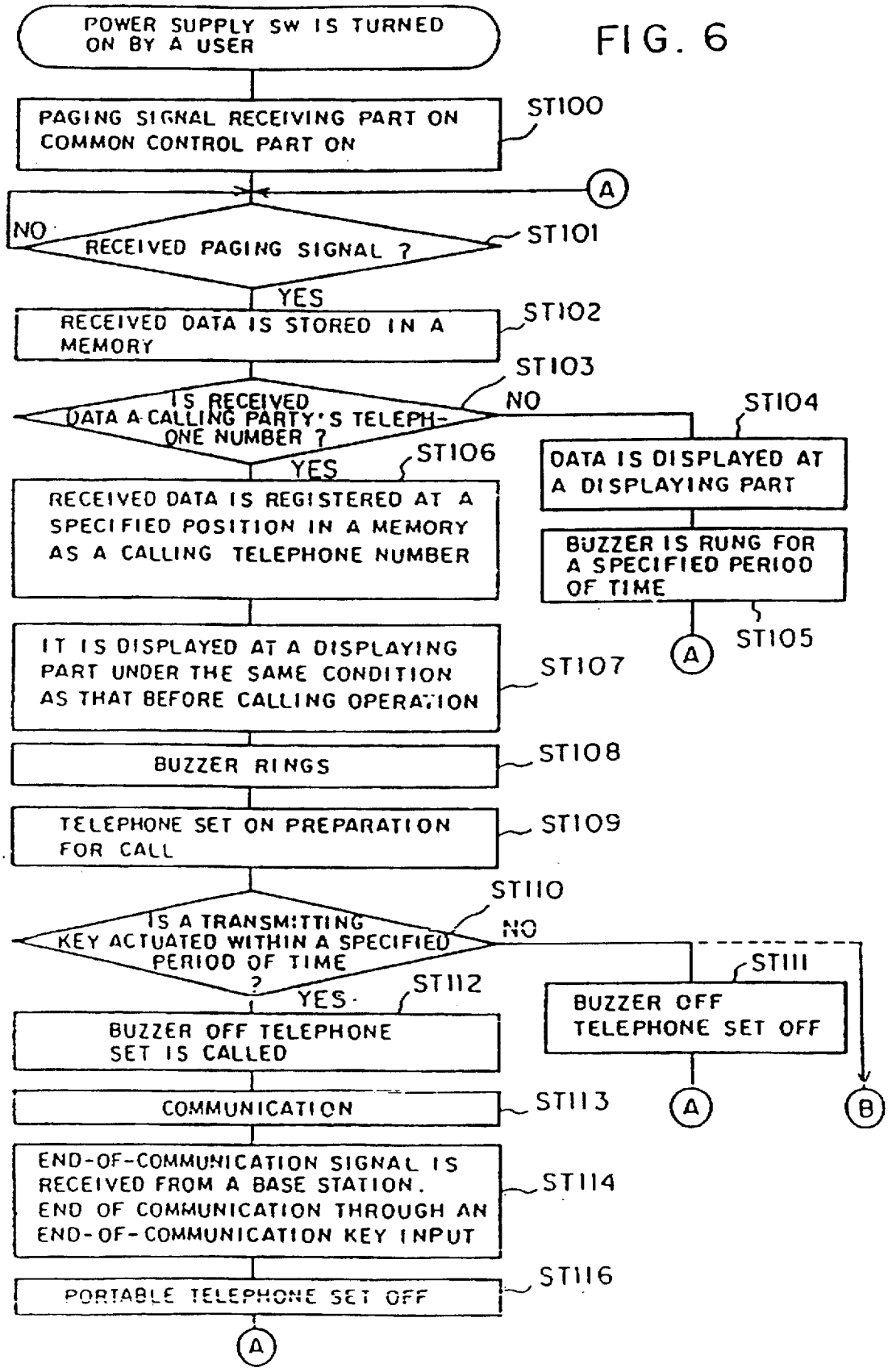
FIG. 6
POWER SUPPLY SW IS TURNED ON BY A USER
PAGING SIGNAL RECEIVING PART ON COMMON CONTROL PART ON
ST100
A
NO
RECEIVED PAGING SIGNAL ?
ST101
YES
RECEIVED DATA IS STORED IN A MEMORY
ST102
ST103
IS RECEIVED DATA A CALLING PARTY'S TELEPHONE NUMBER ?
NO
ST104
DATA IS DISPLAYED AT A DISPLAYING PART
BUZZER IS RUNG FOR A SPECIFIED PERIOD OF TIME
ST105
A
YES
ST106
RECEIVED DATA IS REGISTERED AT A SPECIFIED POSITION IN A MEMORY AS A CALLING TELEPHONE NUMBER
IT IS DISPLAYED AT A DISPLAYING PART UNDER THE SAME CONDITION AS THAT BEFORE CALLING OPERATION
ST107
BUZZER RINGS
ST108
TELEPHONE SET ON PREPARATION FOR CALL
ST109
ST110
IS A TRANSMITTING KEY ACTUATED WITHIN A SPECIFIED PERIOD OF TIME ?
NO
ST111
BUZZER OFF TELEPHONE SET OFF
A
B
YES
ST112
BUZZER OFF TELEPHONE SET IS CALLED
COMMUNICATION
ST113
END-OF-COMMUNICATION SIGNAL IS RECEIVED FROM A BASE STATION. END OF COMMUNICATION THROUGH AN END-OF-COMMUNICATION KEY INPUT
ST114
PORTABLE TELEPHONE SET OFF
ST116
A (B)

(A)

MOBILE TELEPHONE DEVICE WITH LOW POWER CONSUMPTION

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a mobile telephone device having an incoming call receiving function associated with a paging subsystem thereof.

2. Description of Background Art

FIG. 1 is a perspective view showing the external appearance of a conventional type of portable telephone set. FIG. 2 is a block diagram showing a circuit configuration of a conventional type of telephone set. In each of the figures, 101 denotes an antenna for transmitting or receiving an electromagnetic wave, 105 a CPU (a control part) for analyzing received data and controlling each of the blocks, 106, a memory for use with CPU 105, 107 a display part, 108 an operating part such as a keyboard, 109 a buzzer (a ringing element) for informing the presence of an incoming call to an operator, 152, 153 a receiving filter and a transmitting filter, respectively, connected to the antenna 101 for use in blocking a non-required band, 154 a receiving part for demodulating a high frequency signal to a base band signal, 155 a frequency synthesizer for applying a reference frequency to the receiving part 154 and a transmitting part 156 modulating the base band signal into a high frequency signal, 157 a data modulation/demodulation part for modulating a control signal of the base band signal demodulated by the receiving part 154 into a digital signal and modulating a digital signal to the base band signal, 158 a voice signal processing part for processing a voice signal for communication, 159 an ear piece (a voice output means) to cause an operator to listen sound, 160 a microphone through which an operator may input voice (voice input means), and 161 a battery (a power supplying means) acting as a power supply for each of the blocks.

An example of a mobile telephone device is "Personal Portable Cellular Telephone" Model 900, manufactured by Mitsubishi Electric Corporation.

FIG. 3 is a perspective view showing the external appearance of a conventional type of paging receiving device, and FIG. 4 is a block diagram for showing a circuit configuration of FIG. 3. In the figures, 201 denotes an antenna, 203 a receiving part for demodulating a high frequency signal into a base band signal, 204 a data demodulation part for demodulating a base band signal into a digital signal, 205 a CPU for analyzing the received data of the digital signal, 207 a displaying part, 208 an operating part, 209 a buzzer for informing the presence of a call to an operator, 210 a battery acting as a power supply for each of the blocks, and 211 is a DC/DC converter for converting an output voltage of the battery 210.

An example of a paging device is an "RDS FM pager type FR-50E (for Swedish System)" manufactured by Mitsubishi Electric Corporation.

The operation of each of the circuits of FIGS. 2 and 4 will now be described. First, an operation in which a portable telephone set is called up from a base station and the like will be described. A signal containing a call signal transmitted from the base station is received by the antenna 101. A required frequency band is filtered out from this signal by the receiving filter 152. Then, the receiving part 154 may use a tuning frequency supplied from the frequency synthesizer 155 to demodulate the filtered signal into a base band signal and output it to the data modulation/demodulation part 157. The data modulation/demodulation part 157 may demodulate the base band signal into a digital signal and then output it to the CPU 105. The CPU 105 may ring the buzzer 109 to call up the operator upon sensing a call signal in the digital signals.

When the operator acknowledges the sound of buzzer and depresses a transmitting key to the operating part 108, the CPU 105 may acknowledge this depressing action and initiate a return call via the base station. After this operation, the operator may use the microphone 160 and the ear piece 159 to communicate. During this period, the voice signal processing part 158 may process the voice signal, a voice signal inputted from the microphone 160 is outputted as a base band signal and the base band signal input from the receiving part 154 becomes a voice signal and is outputted to the ear piece 159. The transmitting part 156 and the receiving part 154 may perform a modulation and a demodulation between the base band signal and the predetermined frequency signal. The signal modulated at the transmitting part 156 is transmitted from the antenna 101 and the signal received at the antenna 101 is inputted to the receiving part 154. Under a waiting (standby) condition for receiving a call signal, power must be supplied from battery 161 to the receiving part 154, frequency synthesizer 155, data modulation/demodulation part 157, CPU 105, memory 106, displaying part 107, operation part 108 and buzzer 109.

The operation of the paging receiving machine shown in FIGS. 3 and 4 will now be described. With respect to the paging receiving machine, an example will be described in which the machine is operated by a voltage having an output voltage of battery 210 converted into a 5 V through DC/DC converter 211. In a similar manner as that of a portable telephone set, a signal sent from a base station, or the like, is passed through the antenna 201, receiving part 203 and data demodulation part 204 and then converted into a digital signal. After receiving the digital signal, the CPU 205 detects a call signal from a calling party and stores a message contained in the call signal into the memory 206, and at the same time, displays it at the display part 207. It further rings the buzzer 209 to call up the operator. The operator acknowledges the sound of the buzzer, looks at a message displayed at the displaying part, and can perform a corresponding countermeasure. For example, in case the message is a telephone number of a calling party, the operator can communicate with the party through another totally separate communication means, such as a public telephone system.

Since the conventional type of portable telephone set is constructed as above in FIG. 2, a power supply must always be supplied to the frequency synthesizer 155 in such a way that the operator can monitor the calling signal in a standby mode, resulting in substantial consumption of power during the waiting (standby) time, so the charge on battery 161 is depleted, shortening the operating time thereof.

Although the conventional type of paging receiving machine of FIG. 4 has a lower power consumption level and a longer operating time of the batter 210, as compared with that of the portable telephone set of FIG. 2, it has other disadvantages For example, in the case where communication is required after being called up, a telephone number of called party displayed at the displaying part 207 of the paging receiving machine must be manually input into a separate telephone system to perform a communication, resulting in an inconvenience and so a long time passes before the communication is started.

SUMMARY OF THE INVENTION

The present invention eliminates the above-described problems and its object is to provide a mobile telephone device in which operating time for a given battery can be extended, initial communication can be carried out with a paging device which receives a call and a call can be transmitted to a calling party at once after the call signal is received by the paging device.

The objects of the present invention are fulfilled by providing a mobile telephone device comprising:

an antenna for receiving and transmitting high frequency communication signals;

operator input/output means for enabling an operator to input data or voice communications into said telephone device or receive data or voice communications from the device, said input/output means including, means for generating a standby signal for initiating a call waiting period (standby time) in which the telephone device can receive incoming calls, and means for generating a transmit (talk) signal for initiating a voice transmission period (talk time) in which the telephone device can transmit and receive voice and data communications;

control means connected to said operator input/output means for receiving said standby and transmit signals to place said telephone device in either standby or voice transmission (talk) modes, respectively;

first signal processor means for receiving and transmitting voice and data communication signals from and to the antenna, and transporting said voice and data communication signals between the antenna and the control means, said first signal processor means having a first power consumption level when energized by electrical power;

second signal processor means for receiving data communication signals of incoming calls from the antenna and transporting the data communication signals from the antenna to the control means, said second signal processor means having a second power consumption level when energized by electrical power which is lower than the first power consumption level of the first processor means;

power supply means for energizing the telephone device with electrical power; and power supply control means, responsive to the control means placing the telephone device in the standby mode, for selectively supplying said electrical power only to said operator input/output means, control means and second signal processor means, and responsive to the control means placing the telephone device in a voice transmission mode, for also supplying said electrical power to said first signal processor means.

The high frequency communication signals received or transmitted by the antenna include first high frequency signals and second high frequency signals of different respective frequencies.

The first processor means is a conventional mobile telephone transceiver and it processes only the first high frequency signals, i.e. the carrier frequency and information modulated thereon of conventional cellular telephone systems.

The second processor means can be a conventional receiver portion of an FM paging device and it processes only the second high frequency signals (paging signals), i.e. the carrier frequency of the FM pager.

The system of the present invention prolongs the operating time of a battery used in a mobile telephone device. The operating time includes the sum of "standby" time and "talk" time. "Standby" time is the time that a mobile telephone device has the power turned on while waiting for an incoming call from a calling party. "Talk" time is the cellular air time, or the time that voice communications are conducted between the mobile device and the calling or called party's telephone. By removing power from a majority of the components of the mobile telephone device, especially the frequency synthesizer, during "standby" time, the operating time of the battery can be extended. The second signal processor means (the FM pager) subsystem makes this possible, since it consumes far less power than the first signal processor means (the telephone transceiver); and, therefore, the FM pager can be used to receive paging signals, including a calling party's telephone number.

For purposes of the following description, the mobile telephone device of the present invention may be considered to be in a "standby mode" during "standby" time, and in a "talk mode" during "talk" time.

BRIEF DESCRIPTION OF THE DRAWINGS

FIG. 6 is a flow chart illustrating the operation of the mobile telephone set shown in FIGS. 5A and 5B.

DETAILED DESCRIPTION OF THE PREFERRED EMBODIMENTS

Figure 3:
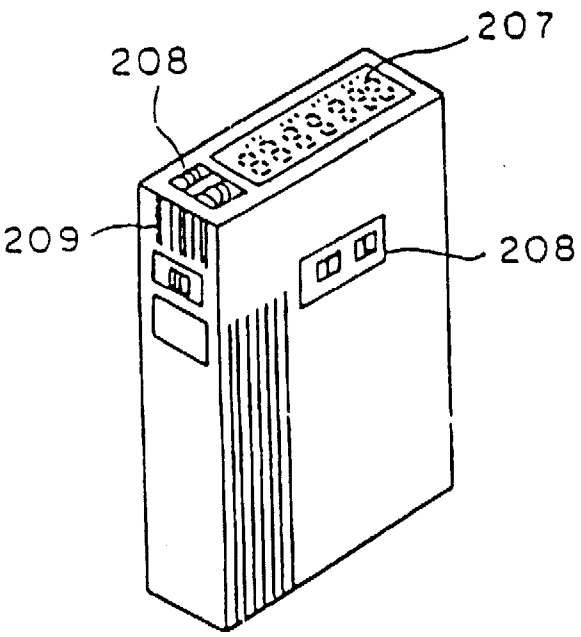
FIG. 3 (PRIOR ART)
FIG. 3 is a perspective view showing the external appearance of a conventional type of paging receiver.
Figure 1:
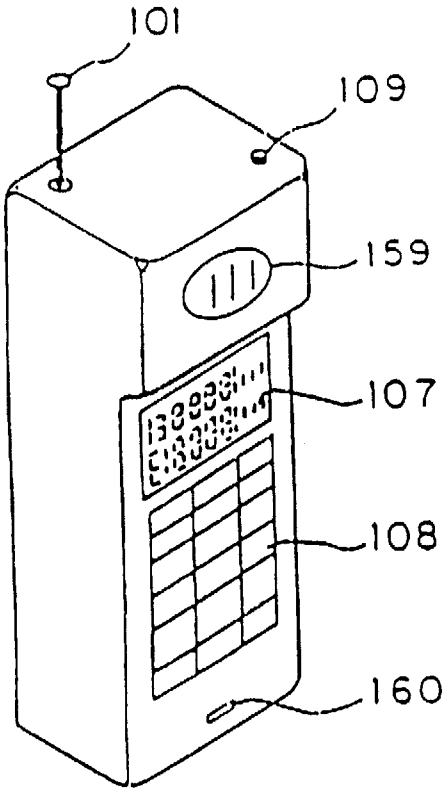
FIG. 1 (PRIOR ART)
FIG. 1 is a perspective view showing the external appearance of a conventional type of portable telephone set.
Figure 2:
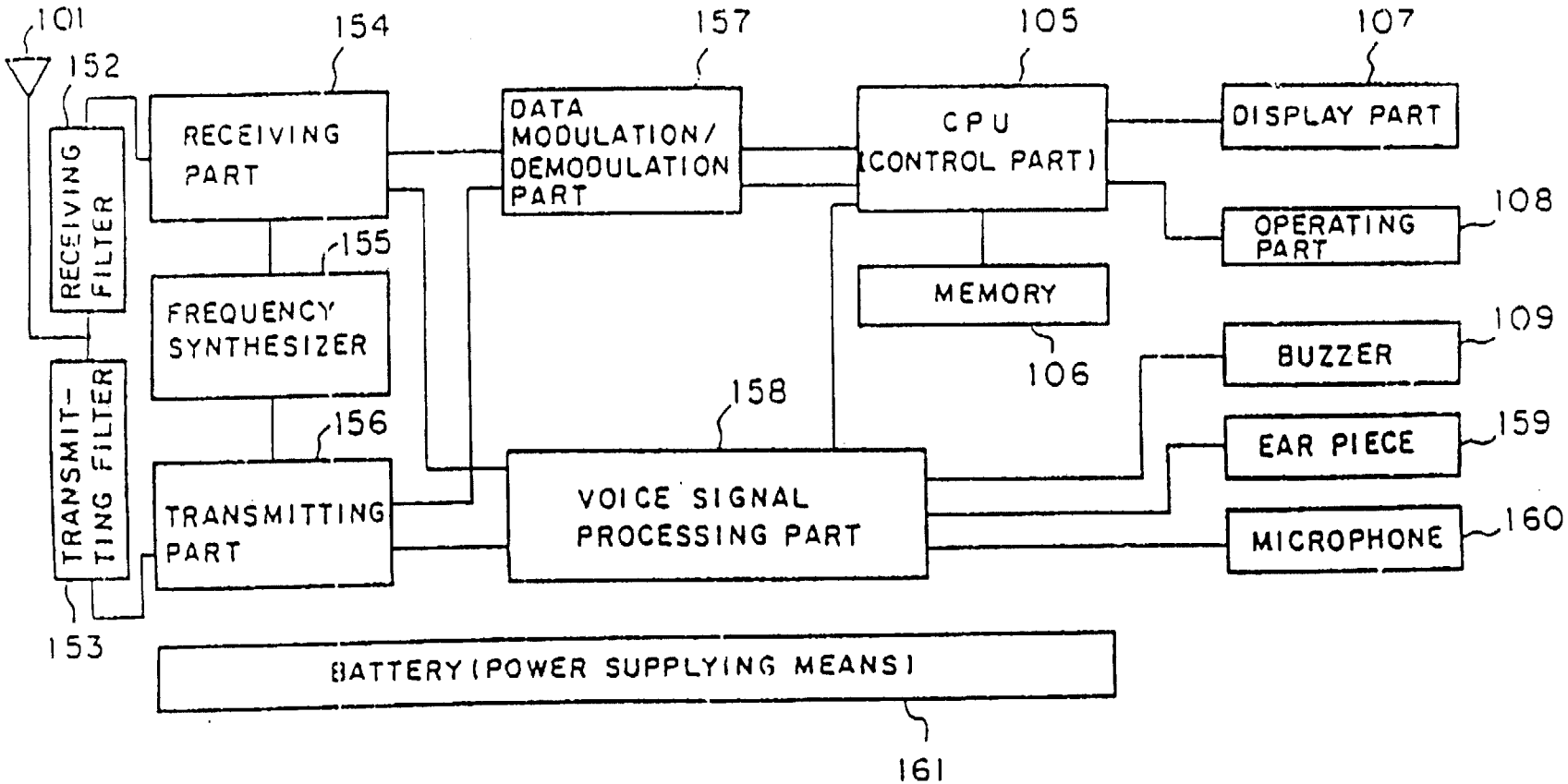
FIG. 2 (PRIOR ART)
FIG. 2 is a block diagram showing the circuit configuration of the conventional type of portable telephone set of FIG. 1.
Figure 5A:
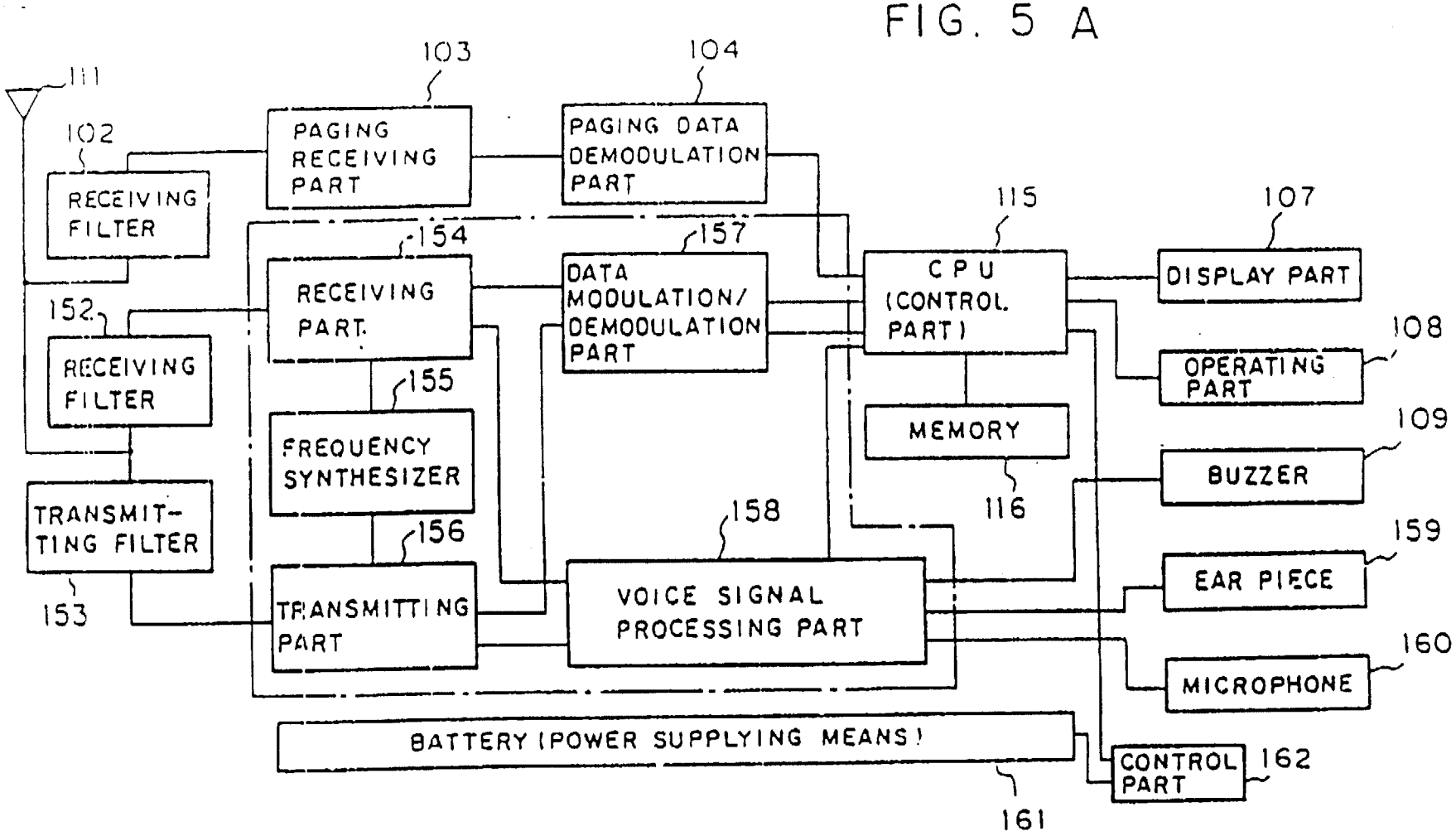
FIG. 5A is a block diagram showing a circuit configuration of a mobile telephone set according to first preferred embodiment of the present invention.

One preferred embodiment of the present invention will be described in reference to the drawings. In FIG. 5A, 102 denotes a receiving filter for a paging function for use in passing signals in the frequency range of a paging signal, 103 a paging receiving part for demodulating a high frequency signal of the paging signal into a base band signal, 104 a paging data demodulation part for remodulating the base band signal of the paging signal to a digital signal, 111 an antenna for receiving either a high frequency (a second high frequency wave) associated with a paging function or a voice communication (a first high frequency wave), 115 CPU (a controlling part) including an instantaneous calling means, 116 a memory associated with the CPU 115 and 162 a control part for the power supply 161. Other component elements are designated by the same numerals as those of FIG. 2.

Figure 5B:
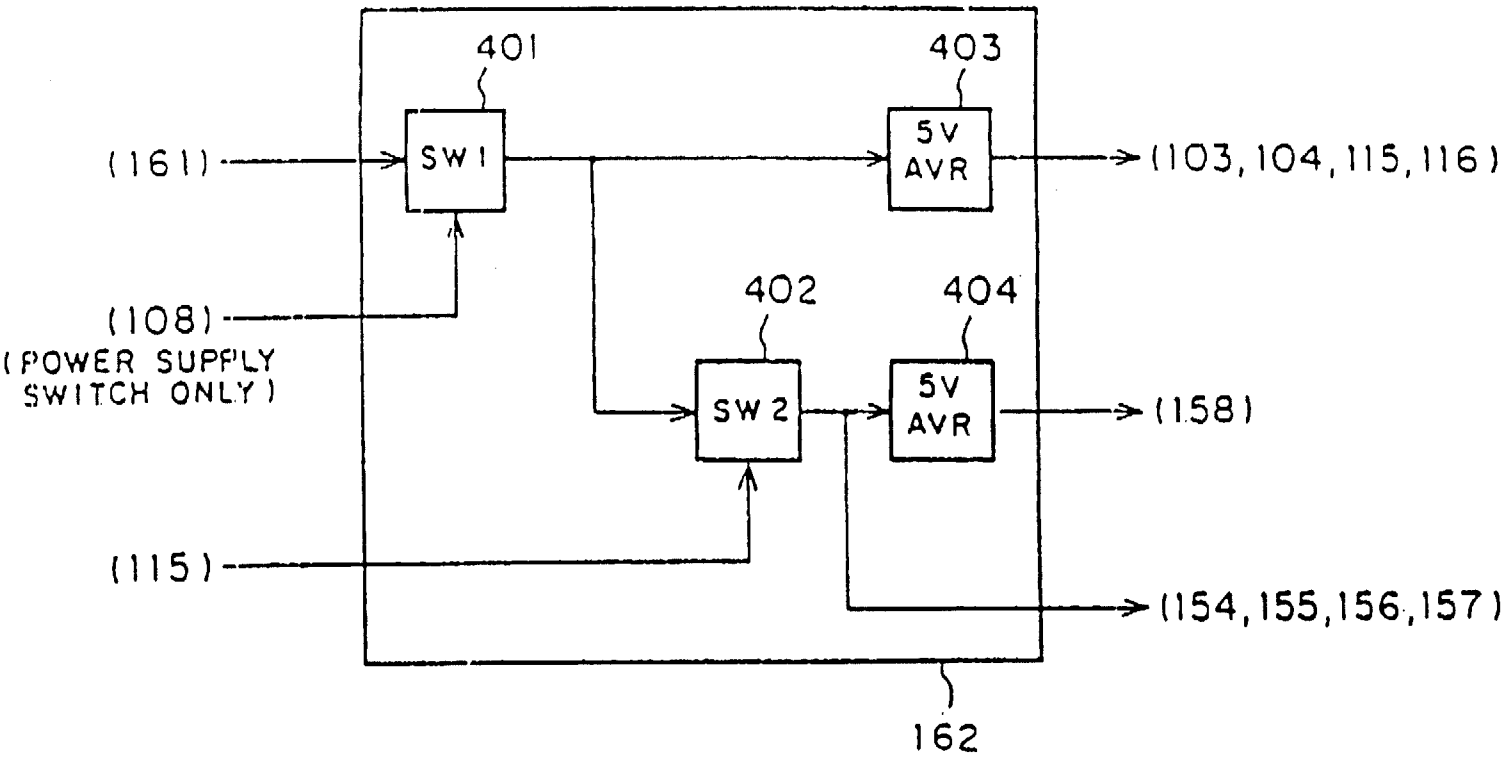
FIG. 5B is a block diagram showing details of control part 162 of FIG. 5A.

FIG. 5B is a detailed circuit diagram of the power control part 162 in FIG. 5A. Reference numeral 401 depicts a main power switch which is directly controlled by means of a power supply key an the key pad of the operating part 108 and turns on and off the power of the battery 161. The output of the main power switch 401 is connected to an automatic voltage regulator (AVR) of 5 V and a power switch 402 for the mobile telephone transceiver portions of FIG. 5A including parts 154, 155, 156, 157. The AVR 403 generates an output of 5 V D.C. and applies power to paging portions 103, 104 and control part 115; 116. Switch 402 is turned on and off by a power supply control line from CPU 115. The output of switch 402 is directly transmitted and supplies the power to the transceiver portions 154, 155, 156, 157 of the mobile telephone, and to the voice signal processing part 158 via AVR 404. Switches 401 and 402 may be any suitable type of semiconductor switches known in the art.

The operation of the mobile telephone device of FIGS. 5A and 5B will now be described in reference to the flow chart shown in FIG. 6. After a power supply switch on keyboard 108 is turned on, that is, during a waiting (standby) period, power is supplied from the battery 161 via switch 401 and AVR 403 to portions 103, 104, 115, 116 but not to the portions 154, 155, 156, 157 enclosed by the doted line in FIG. 5 (step ST 100). The high frequency signal received at the antenna 111 passes through the paging filter 102 and then is inputted into the paging receiving part 103. The CPU 115 detects a call signal in the digital signal demodulated by the paging receiving part 103 and the paging data demodulation part 104, and stores a message (received data) contained in the call signal in the memory 116. In case that the received data is not a telephone number of a party to be called up, the received data is displayed at the display part 107 (step ST104), rings the buzzer 109 for a specified period of time to inform the operator (step ST105).

In case that the data is a telephone number of a party to be called up in step ST03, the received data is transferred to and registered in a region specified for telephone numbers to be called from the memory 116 (step ST106). When a telephone number is inputted independently of a received call from the operating part 108 (the keyboard) of the mobile telephone set, it is displayed on the display part 107. Likewise, when the telephone number of a party to be called up, received through the paging portions of FIG. 5A is received, it is displayed in the displaying part 107 in a similar fashion (step ST107). In addition, an instruction is applied to the power supply control part 162 and switch 402 therein in such a way that the buzzer 109 may be rung via pat 158 (step ST108) and both the transmitting and receiving of voice communications can be performed. Also, the power supply control part 162 via switch 402 connects each of the non-energized blocks 154, 155, 156, 157 with the battery 161 (step ST109).

Under this condition, if the transmitting key ("SEND" key on keyboard 108) is depressed, the CPU 115 will acknowledge this depressing operation and stop the ringing of the buzzer 109. The CPU 115 may then execute an instantaneous calling program, retrieve a telephone number of a party to be called from memory 116 as a digital control signal from the telephone number region thereof and then output it as a digital control signal to the data modulation/demodulation part 157. The telephone number of the party to be called up becomes a base band signal at the data modulation/demodulation part 157. Further, the telephone number of the party to be called up is modulated at the transmitting part 156 as a control signal and then transmitted to the base station of a cellular system from the antenna 111 through a transmitting filter 153 (step ST112). Thereafter, a conversation may be carried out in the same manner as would be done with a conventional type of mobile telephone set (step ST113), and, thereafter, an "end of conversation" signal is received from the base station, or from depression of an end of conversation key on keyboard 108, and the conversation is terminated (step ST114). Then the CPU 115 may execute an instruction program and give an instruction to the power supply control part 162 and once again shut off the battery 161 from each of the blocks enclosed by the dotted line in FIG. 5A. That is, the system returns to its waiting (standby) condition (step ST116). In case that the transmitting (SEND) key is not depressed at the step ST110 within a specified period of time, CPU 115 may execute the program of storing the telephone number of a party to be called up, display the fact that the call was received at the display part 107, stop the ringing of the buzzer 109, and return to the waiting (standby) condition (step ST111).

Figure 7:
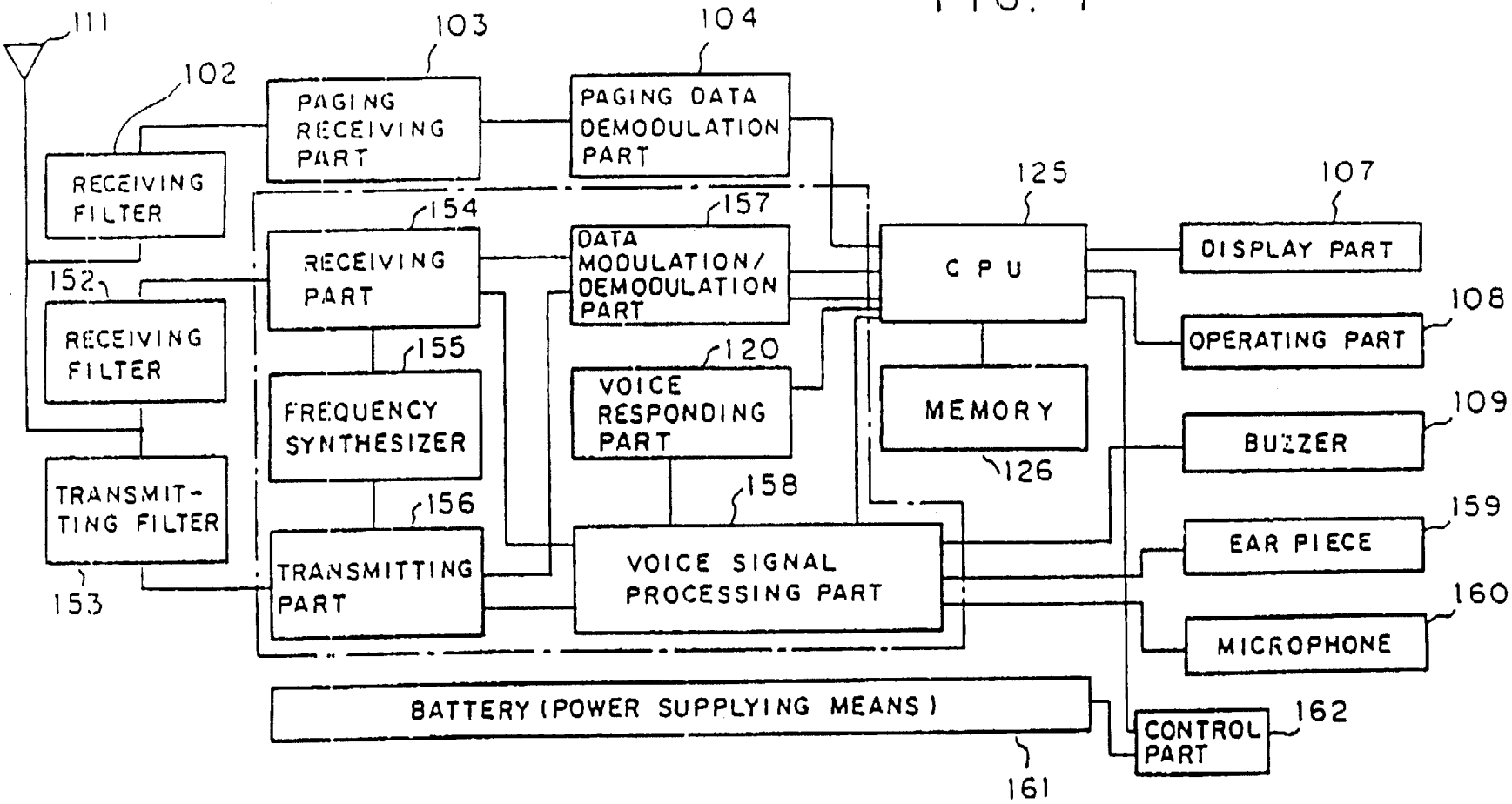
FIG. 7 is a block diagram for showing a circuit configuration of a mobile telephone set according to second and third preferred embodiments of the present invention.

FIG. 7 illustrates a mobile telephone device according to a second preferred embodiment in which in addition to the circuit configuration shown in FIG. 5A and 5B, a voice responding part 120 is added and voice responding means is added to the CPU 125. The voice responding part 120 is comprised of ROM in which a predetermined message is coded and a decoding circuit for use in converting the coded data within the ROM into a voice signal. For example, a coding system can be realized through ADPCM (Adaptive Differential Pulse Code Modulation) and a decoding circuit can be realized with a ADPCM decoding LSI, such as a type MSM 6258, ADPCM production/reproduction IC manufactured by Oki Electric Industry Co., Ltd. With this arrangement, a more effective processing can be realized in the event that the transmitting (SEND) key is not depressed within a specified period of time at step ST110 in FIG. 6.

Figure 8:
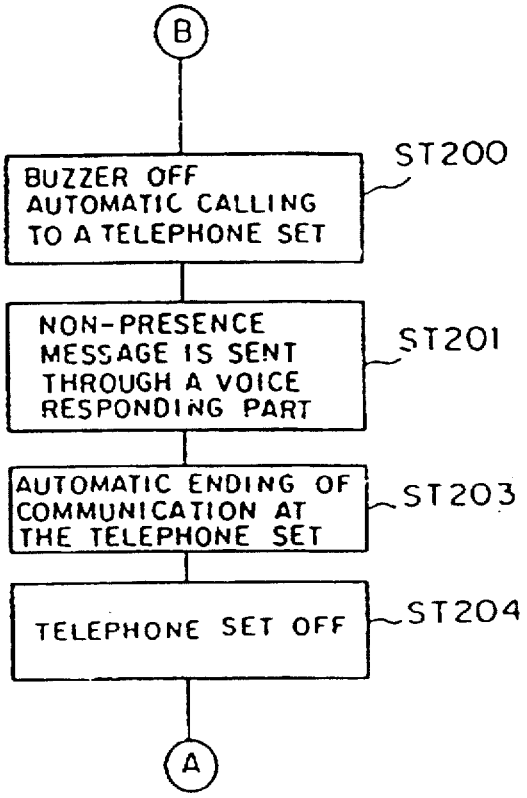
FIG. 8 is a flow chart illustrating the operation of a mobile telephone set according to the second and third preferred embodiments of the present invention of FIG. 7.
Figure 8:
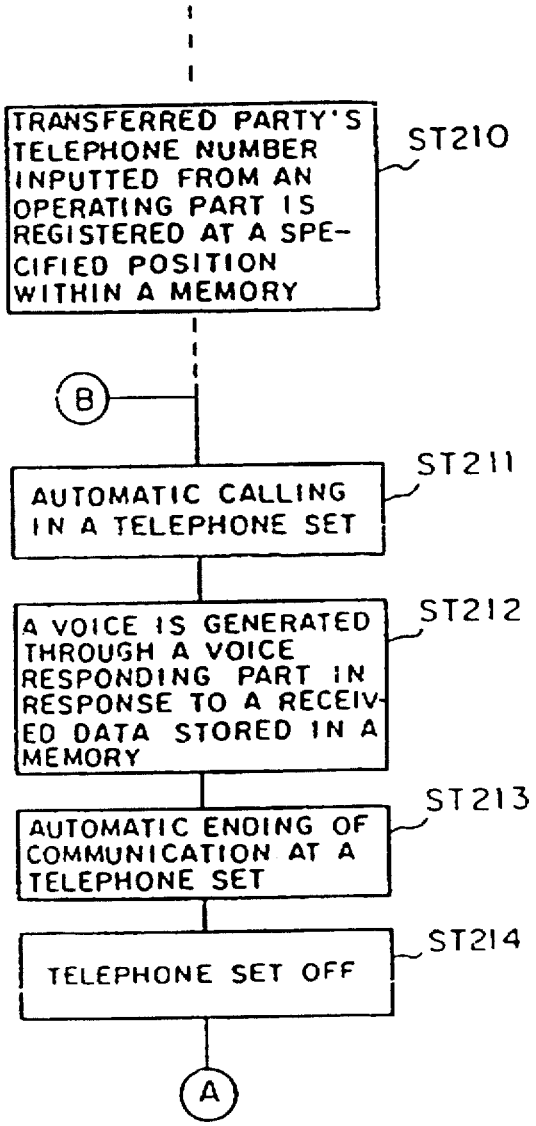

Referring now to the flow charts of FIGS. 6 and 8(A), the operation of the circuit of FIG. 7 will be described. CPU 125 may detect a telephone number of a party to be called and perform each of the functions in steps ST106 to ST109. Thereafter, if the transmitting (SEND) key is not depressed within a specified period of time (step ST110), the circuit or FIG. 7 may perform the processing of FIG. 8A subsequent the step ST200. At first, CPU 125 may execute the instantaneous call program, retrieve the telephone number of a party to be called out of the region of the telephone numbers in memory 126 to be used for calling, and then output the telephone number of the party to be called up to the transmitting part 156 through the data modulation/demodulation part 157 so as to call the number (step ST200). If the party to be called up responds to the call, CPU 125 may execute the voice responding program therein and output a coded message indicating the absence of a party at the mobile telephone, said message being stored in the ROM of the voice responding part 126 including the ADPCM decoding LSI. The ADPCM decoding LSI converts the coded message into a synthetic voice message and then outputs it to the voice signal processing part 158. In this way, a synthetic voice message indicating the absence of a party at the mobile telephone is sent out to the calling party (step ST201). Upon completion of the sending of the synthetic voice message, it causes the communication to be automatically terminated (step ST203) and the mobile telephone is returned back to its waiting (standby) condition (step ST204). At this time, the fact that the call was received may be displayed on display 107.

Figure 9:
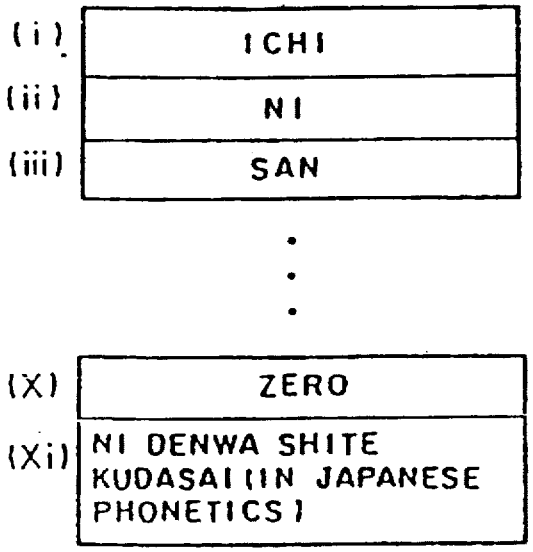
FIG. 9 is a diagrammatic view illustrating one example of the contents of a ROM shown in FIG. 7.

In the above-described preferred embodiment, a system having a voice responding means added within CPU 125 has been described. However, a means for transferring a message to a remote location may also be added to CPU 125 (a third preferred embodiment). That is, as shown in FIG. 9, a ROM at the voice responding part has stored voice messages corresponding to "1" to "0" (that is, "ichi" to "zero" in Japanese phonetics) and voices of proper messages (". . . ni denwa o shite kudasai" in Japanese phonetics in FIG. 9) which are coded as data in advance. Further, a transfer telephone number (the number of a remote telephone device to which the message shall be forwarded) inputted from the keyboard 108 is stored in advance in a transfer telephone number region in the memory 126 (step ST210). Under this condition, in the event that a depression of the transmitting (SEND) key could not be detected in step ST110 in FIG. 6 within a specified period of time, CPU 125 may perform operations subsequent to step ST211 indicated in FIG. 8B. At first, CPU 125 may execute the transferring program and output a telephone number to which the message is to be forwarded stored in the transfer telephone number region to the data modulation/demodulation part 157. Then a call is placed in the same manner as that of the first preferred embodiment (step ST211). Then CPU 125 executes the voice responding program and outputs the coded data corresponding to each of the digits of the calling telephone number stored in the calling party's telephone number region in the memory 126 in sequence to the LSI for the decoding ADPCM. Then, it may output a message within the ROM upon completion of the output of the coded data corresponding to all digits (step ST212). As described above, in this way, it is possible to deliver a voice message of (..ni denwa o shite kudasai (in Japanese phonetics)) in addition to the calling party's telephone number to be called up to an operator who is present at the remote location to which the message is forwarded. Operations after completion of delivering of the voice message (steps ST213 and ST214) are similar to that of the above-described preferred embodiments.

Figure 10:
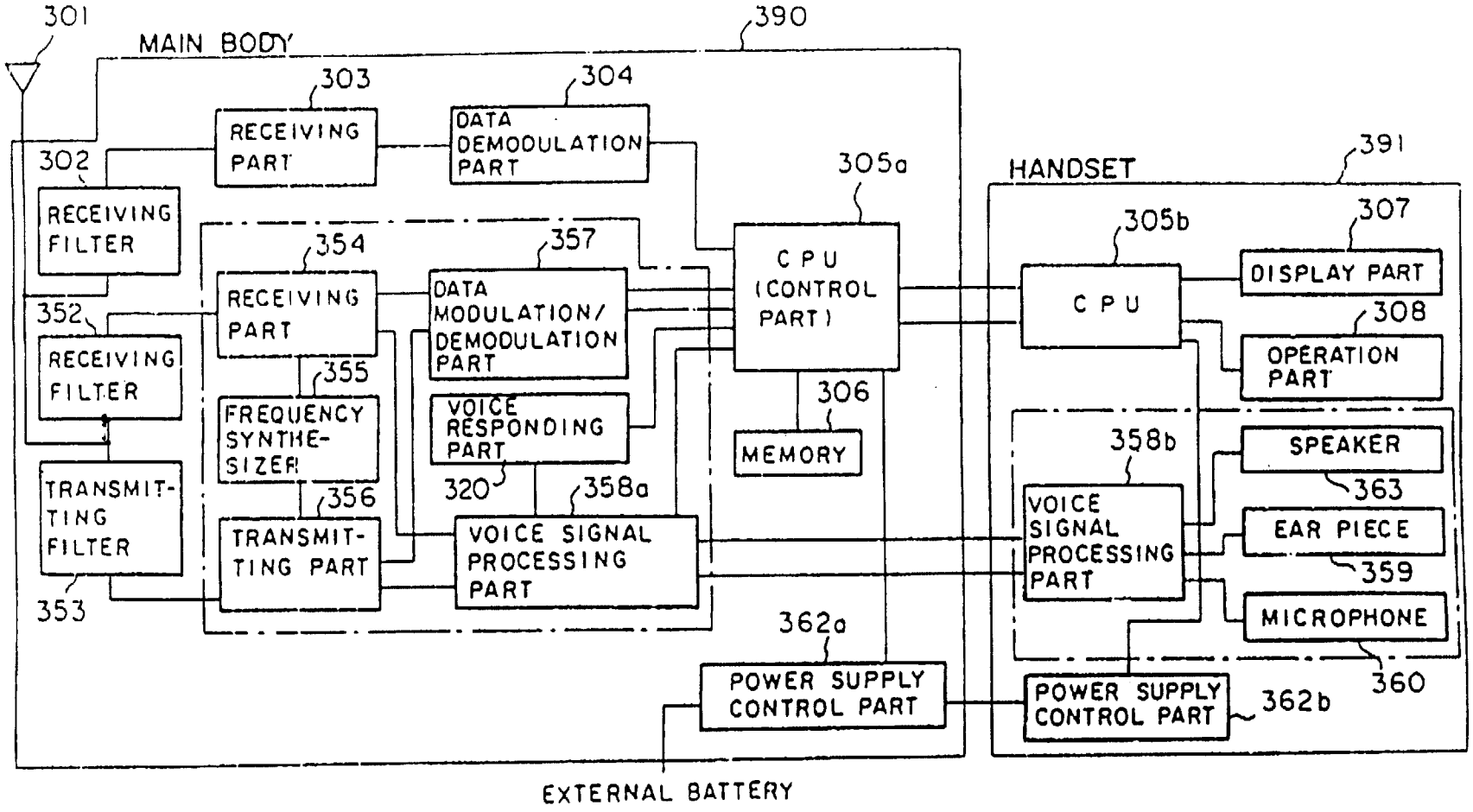
FIG. 10 is a block diagram showing a circuit configuration of a mobile telephone set according to a fourth preferred embodiment of the present invention.
Figure 11:
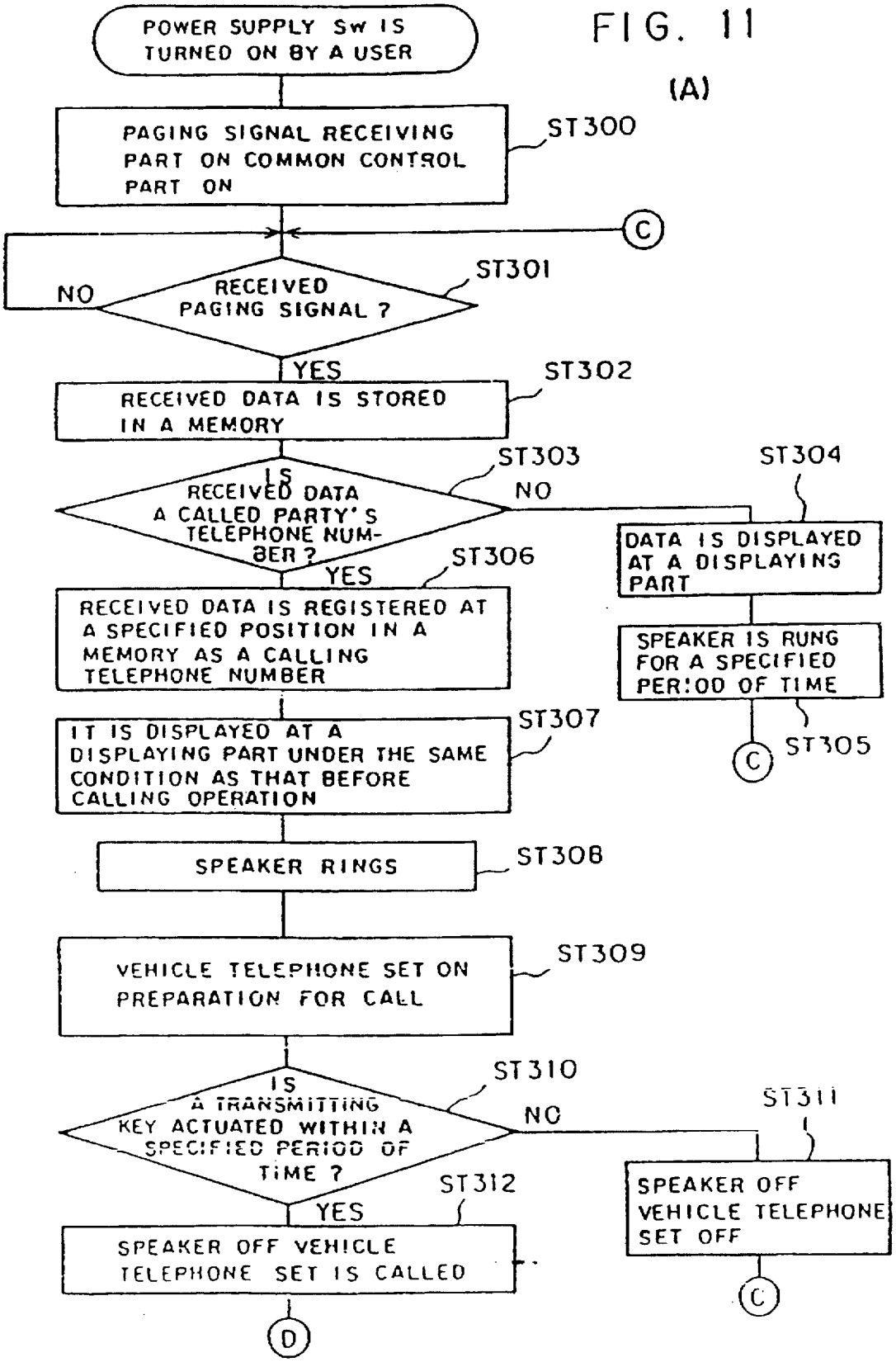

FIG. 10 is a block diagram showing a circuit configuration of a mobile telephone device according to a fourth preferred embodiment of the present invention. The preferred embodiment is an example in which the mobile telephone device is comprised of a main body 390 of a wireless device and a handset 391 and in particular, it is an example of a mobile telephone device to be installed in a vehicle. In the figure, 301 denotes a common antenna for use both in paging and mobile telephone functions, 302 a receiving filter for the paging function, 303 a receiving part for the paging function, 304 a data demodulation part for the paging function, 305a a CPU (a control part) at a main body for controlling the main body 390 of a wireless device, 306 a memory which CPU 305 at the main body uses, 352 and 353 a receiving filter and a transmitting filter, respectively, 354 a receiving part, 355 a frequency synthesizer, 356 a transmitting part, 357 a data modulation/demodulation part, 358a a voice signal processing part at the main body 390 of the wireless device, 362 a power supply control part (similar to part 162 of FIG. 5B) at the main body 390 of the wireless device and 320 a voice responding part. 305b denotes a CPU at the handset for controlling the set 391 (a control part at the handset), 307 a display part, 308 an operation part, 358b a voice signal processing part at the handset 391, 359 an ear piece, 360 a mirophone, 363 a speaker, and 362b a power supply control part at the handset. The operation of each of the blocks described above is similar to that corresponding to each of the blocks shown in FIG. 7. In FIG. 10, a speaker 363 is arranged as a ringing element in place of the buzzer 109.

The operation of the device will now be described in reference to the flow chart shown in FIG. 11. After turning on the power supply switch (not shown) only the portion outside of the dotted line in FIG. 10 is supplied with electrical power from an external battery (power supply means) through power supply control portions 362a and 362b (step ST300). Then the CPU 305a at the main body detects a calling signal in a digital signal decoded by the paging receiving part 303 and the paging data decoding part 304 (step ST301) and stores the message data (received data) contained in the calling signal in the memory 306 (step ST302). In case that the received data is not a calling party's telephone number (step ST303), the received data is transferred to the handset side CPU 305b. The CPU 305b at the handset displays the received data to the display part 307 (step ST304), rings the speaker 363 for a specified period of time and informs an operator of the calling (step ST305).

In case that at the step ST303, the number is a calling part's telephone number, the received data is transferred to the region specified as a calling telephone number area within the memory 306 (step ST306). Then, the received data is transferred to the CPU 305b at the handset side. In addition, an instruction is applied to the power supply control part 362a and then a power is supplied to each of the blocks within the dotted line of FIG. 10 not yet energized (step ST309). CPU 305b at the handset may display on part 307 a calling party's telephone number under the same condition as if it was inputted from the keyboard 301 (step ST307). Then, the speaker 363 is rung (step ST308)

Under this condition, as the transmitting (SEND) key at the operation part 308 is depressed, CPU 305b at the handset acknowledges the depressed condition and stops the ringing of the speaker 363. In addition, an instruction is given to the power supply control part 363b to cause the non-energized blocks within the dotted line at the handset 391 to be connected to the external battery so as to supply power thereto (step ST309). In this way, preparation for calling operation is completed for the calling party's telephone number. Thereafter, in the same manner as that of the first preferred embodiment of FIG. 5A, the calling party's telephone number is used to place a call to that party (steps ST310 and ST312), and the operator conducts a conversation (step ST313). After completion of conversation (step ST314), CPU 305a at the main body and CPU 305b at the handset give an instruction to each of the power supply control parts 362a and 362b, respectively, so as to shut off power to the portion of the telephone enclosed by the dotted line in FIG. 10 from the external battery (step ST316).

With the constitution shown in FIG. 10, one having a voice responding part 320 similar to part 120 in FIG. 7 is illustrated. Even if this is not present, it may provide a similar effect.

If the configuration shown in FIG. 10 is used, in the same manner as those of the second and third preferred embodiments, if the transmitting (SEND) key is not depressed at the step ST310 within a specified period of time, more effective processing can be attained. That is to say, in the same manner as that of the second preferred embodiment, CPU 305a at the main body may execute the instantaneous calling program after an elapse of the specified period of time, the calling party's telephone number is used to call it and then the voice responding program is executed to output a message within the ROM of the voice responding party 320 to the voice signal processing part 358. In addition, in the same manner as that of the third preferred embodiment, transferring means may also be applied to the CPU 305 at the handset and CPU 305a at the main body. In this case, CPU 305b at the handset takes the transferring telephone number from the operation part 308 in advance and transfers it to CPU 305a at the main body. Then, CPU 305a at the main body stores the transferring telephone number in a predetermined region in the memory 306. At the step ST310 in FIG. 11, after a specified period of time elapses, CPU 305a at the main body may execute the transferring program to call up the transferring party and execute a voice responding program, resulting in the calling party's telephone number being sent as a voice message.

Since the mobile telephone device to be installed in a vehicle is operated as described above, even if a period during which the battery is not charged with electrical power is extended for a long period of time, it is possible to minimize consumption of the battery mounted in the vehicle. If either the instantaneous calling means or transferring means is provided, transmitting and receiving of a message can be performed even if an operator is not present.

Figure 11:
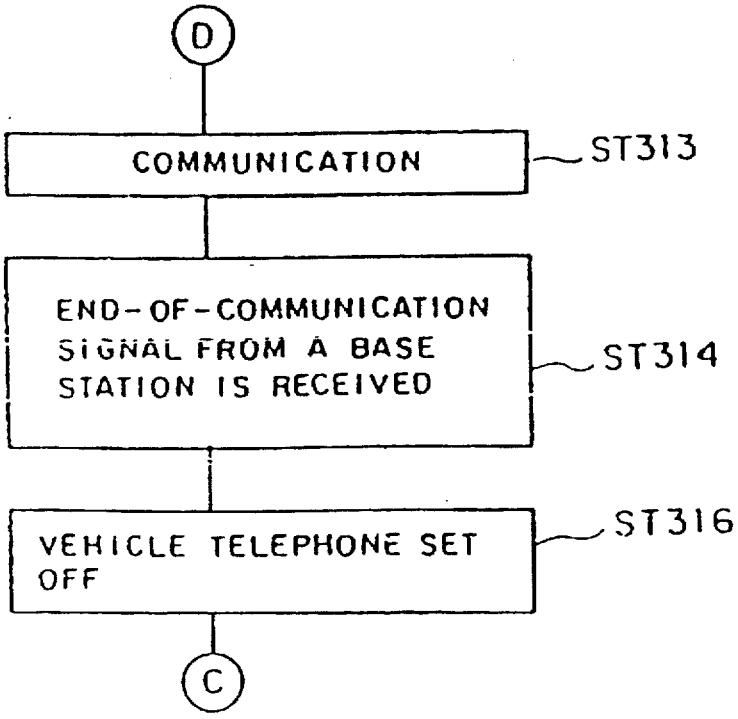
FIG. 11 is a flow chart for illustrating an operation of the mobile telephone set shown in FIG. 10.
Figure 12:
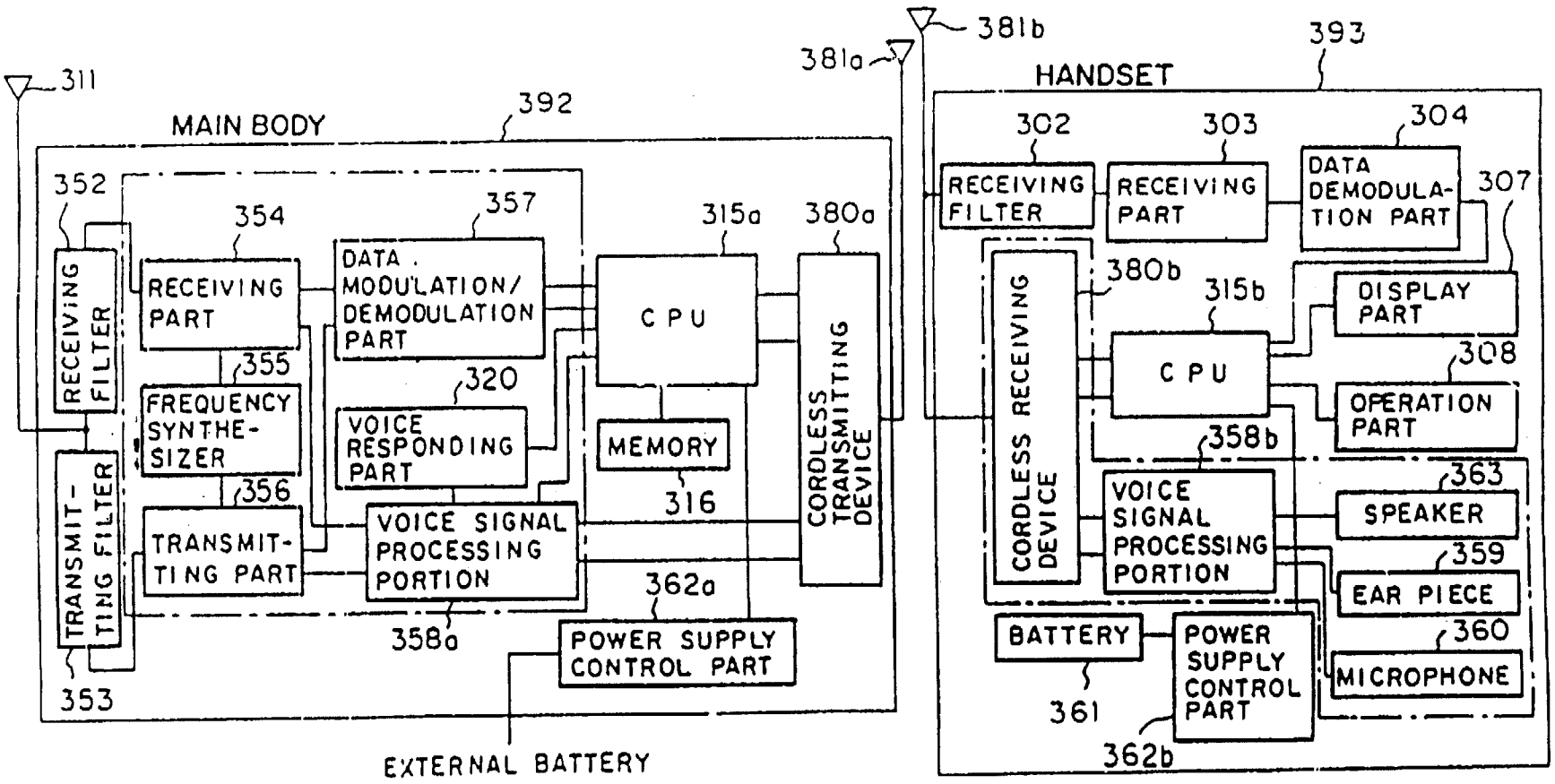
FIG. 12 is a block diagram for showing a circuit configuration of the mobile telephone set according to the fifth preferred embodiment of the present invention.

FIG. 12 illustrates a fifth preferred embodiment in which the main body 392 of the wireless device of the mobile telephone device to be installed in the vehicle shown in FIG. 11 and the handset 393 are connected by a wireless communication link. In this figure, 315a denotes a CPU at the main body, 316 a memory which CPU 315a at the main body uses, 315b a CPU at the handset, 380a and 380b cordless transmitting and receiving devices (simplified wireless means) for receiving a voice signal between each of the voice signal processing portions 358a and 358b and a control signal between CPU 315a and 315b by using a frequency signal (a third high frequency wave) of the cordless telephone set between CPU 380a and 380b at the handset, 381a an antenna (a simplified wireless antenna) for a cordless telephone frequency (the third high frequency wave) arranged in the main body 392 of the wireless machine, 381b an antenna for receiving a paging frequency signal (a second high frequency wave) arranged in the handset and a cordless telephone frequency (antenna at the handset), and 361 a battery for the handset 393 (a power supplying means at the handset). Other elements are the same as those indicated in FIG. 10 with the same reference numerals. In this preferred embodiment, the paging system is received at the handset 393.

The operation of the mobile telephone device is the same as that of the mobile telephone device shown in FIG. 10 except that the paging signal is received at the handset 393 and that receiving of the signal between the main body 392 of the wireless device and the handset 393 is carried out in a wireless manner. That is to say, a control can be performed through either the instantaneous calling means or the transferring means in the same manner as that of the fourth preferred embodiment. With such an arrangement described above, it is possible not only to prevent a consumption of the "external battery" of the car and the battery 361, but also to take the handset 393 out of the vehicle within a range where an electromagnetic wave of the cordless telephone can reach in order to communicate with the main body portion.

Power supply control part 362a is similar to part 162 of FIG. 5B and selectively applies power to parts 354, 355, 356, 357, 320, 358a during calling (talk) time, but not during standby time. Likewise, part 362b is similar to part 162 of FIG. 5B and selectively applies power to parts 380b, 358b, 359, 360, 363 during calling (talk) time, but not during standby time.

Figure 13:
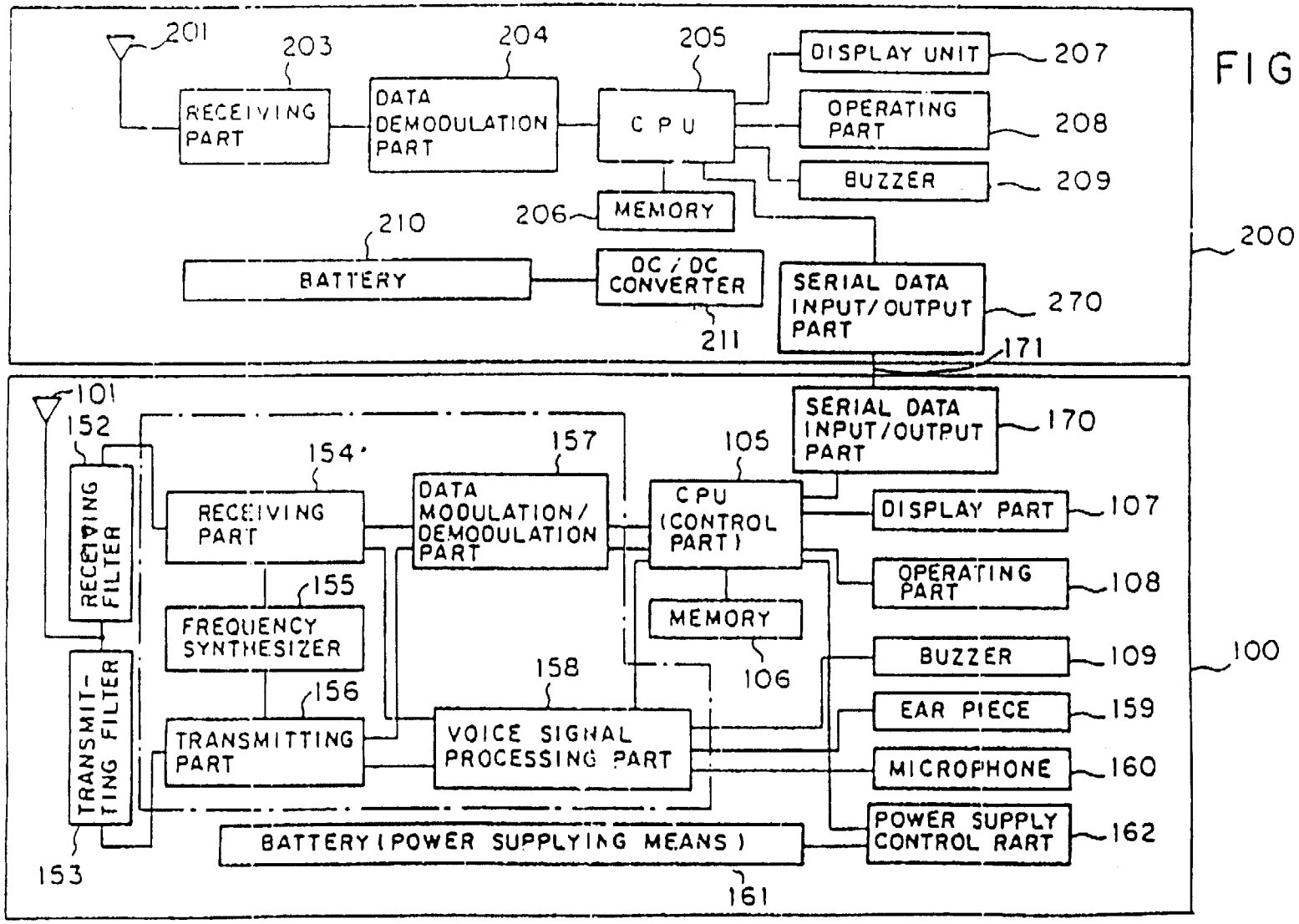
FIG. 13 is a block diagram showing a circuit configuration of the mobile telephone set according to a sixth embodiment of the present invention.

A sixth embodiment of the present invention is illustrated in FIG. 13.

Figure 4:
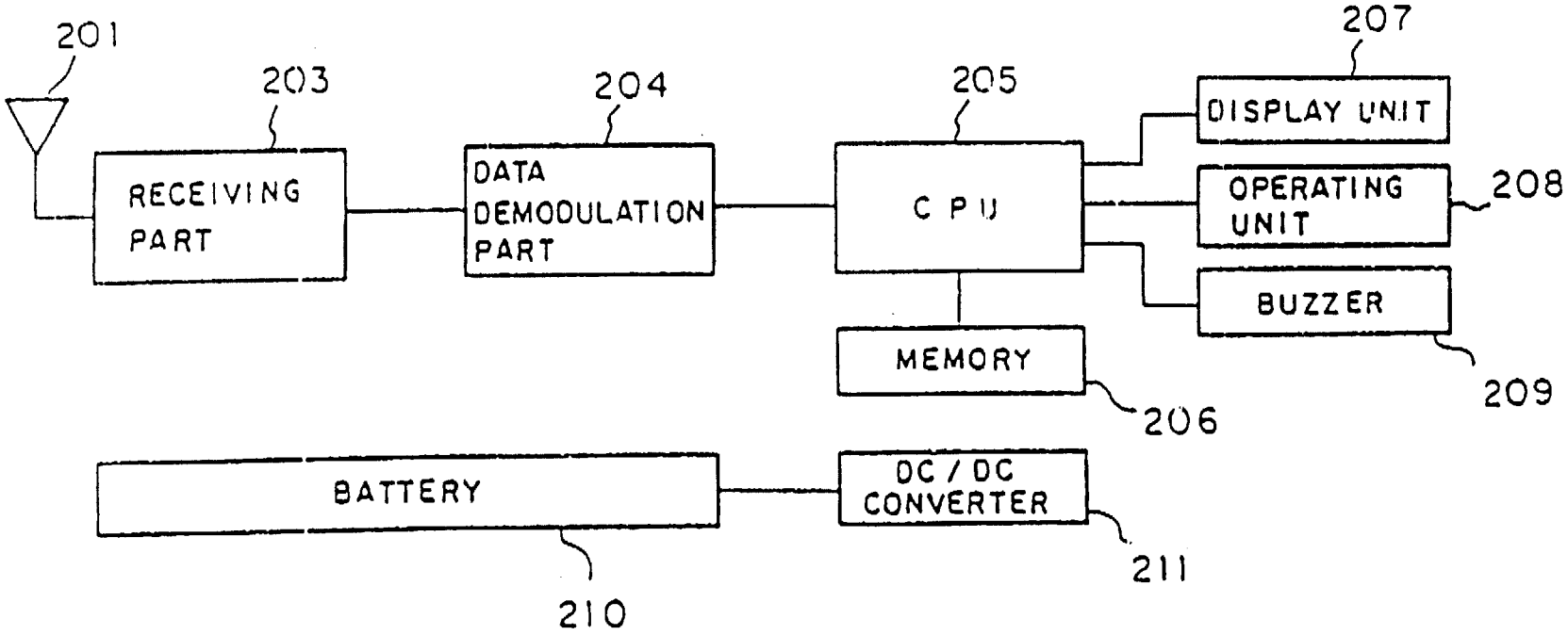
FIG. 4 (PRIOR ART)
FIG. 4 is a block diagram showing a circuit configuration of the conventional type of paging receiver of FIG. 3.

The embodiments in FIGS. 5–12 show integrated-type structures, but FIG. 13 shows a separate-type structure. In FIG. 13, reference numeral 100 depicts a portable telephone device and 200 denotes a paging receiver. The main structure of FIG. 13 is similar to that of FIGS. 2 and 4, like parts being indicated by like reference numerals, except 162, 170 and 270 are additional parts. Reference numeral 162 illustrates the power control part as shown in FIG. 5B and 170, 270 depict serial data input/output parts, relatively. Further, reference numeral 171 denotes a cable for connecting the serial data input/output parts 170 and 270.

The operation of the device in FIG. 13 will now be described.

The portable telephone device 100 is connected with the paging device 200 via the serial data input/output pats 270, 170 by means of the connecting cable 171 and thereby the power supply turns on and is supplied only to the paging device. The following data communication and control can be performed between the portable telephone device 100 and paging receiver 200 via the serial data input/output parts.

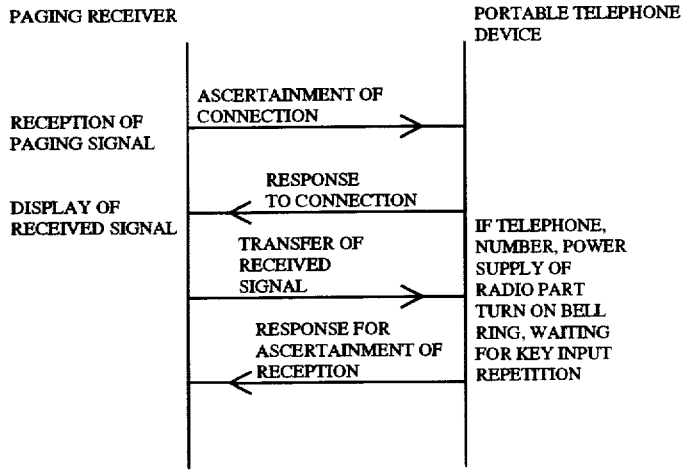

It should be understood that the system of FIG. 13 may also include a voice responding part (synthetic voice generator) within housing 100 connected in the same manner as part 320 of FIG. 12.

The CPUs in all embodiments of the present invention may be one chip 8 bit CPUs, model no. M50747, manufactured by Mitsubishi Electric Corp.

The "voice signal processing" parts of each embodiment may be a digital and analog composite IC-MOS, model no. RKS-5PG6029-001, manufactured by Mitsubishi Electric Corp.

It should be understood that the system of the present invention may be modified as would occur to one of ordinary skill in the art without departing from the spirit and scope of the present invention.

What is claimed is:

1. A mobile telephone device comprising:

an antenna for transmitting or receiving a first high frequency signal having either a voice signal or a control signal modulated thereon and receiving a second high frequency signal having a paging signal modulated thereon;

receiver means connected to the antenna end the below recited control means for demodulating the first high frequency signal received with said antenna to a base band signal;

transmitter means connected to the antenna and the below recited control means for modulating a base band signal of either a voice signal or control signal to generate an outgoing signal of the first high frequency via the antenna;

paging signal receiver means connected to the antenna for extracting the paging signal from the second high frequency signal received by said antenna;

data modulation/demodulation means connected to said transmitter means and receiver means so as to convert either an incoming control signal or an outgoing digital control signal received by or to be output from the antenna;

frequency synthesizer means providing a tuned frequency for said transmitter means and receiver means and connected therebetween;

voice inputting means and voice outputting means for inputting and outputting voice signals into and from said device;

voice signal processing means for processing voice signals inputted from the voice inputting means to output it to said transmitter means and further processing a base band signal inputted from said receiving means to output it to said voice outputting means;

operator input means for outputting control signals selected by an operator to a control means within the device;

display means for displaying a calling party's telephone number received by the paging signal receiver means;

said control means being responsive to a control signal from said operator input means for causing the display of the calling party's telephone number on said display means;

instantaneous calling means contained in said operator input means, for detecting the calling party's telephone number in a paging signal outputted by said paging signal receiver means and outputting said calling party's telephone number as said outgoing digital control signal to said data modulation/demodulation means in response to an excitation signal inputted by an operator to said operation input means;

power supply means for supplying electrical power to said telephone device, said power supply means being connected to each of the foregoing means of the mobile telephone device; and power supply control means connected to said power supply means for shutting off the supply of electrical power from said power supply means to at least said frequency synthesizer means when waiting for an incoming paging signal.

2. A mobile telephone device according to claim 1 wherein the paging receiver means comprises a paging receiver filter for extracting a high frequency signal containing a paging signal from the second high frequency signal received by said antenna, means for converting the output signal of the paging receiver filter to a base band signal and demodulator means for converting said base band signal into a digital signal and outputting said digital signal to said control means.

3. A mobile telephone device according to claim 1 in which the control means includes a calling party's telephone number reserving means for reserving said calling party's telephone number in said display means if an excitation signal is not generated by the instantaneous calling means within a specified period of time following receipt of a paging signal.

4. A mobile telephone device according to claims 1 or 3 in which a ringing element connected to said control means is provided and the control means includes ringing means for driving said ringing element either until said excitation signal is inputted or for a specified period of time.

5. A mobile telephone device according to claim 1 in which the control means includes instructing means for giving an instruction to shut off the power supply control means to the supply of electrical power to at least said frequency synthesizer upon completion of any communication with the calling party.

6. A mobile telephone device according to claim 1 further including synthetic voice generator means for storing a voice message and outputting the voice message to said voice signal processing means, means as a voice signal, and contained in said control means for giving an instruction to output said voice message if an excitation signal is not generated by the instantaneous calling means within a specified period of the following receipt of a paging signal.

7. A mobile telephone device according to claim 6 in which the synthetic voice generating means includes a ROM having data coded with a voice message and a demodulation LSI for demodulating the coded data within the ROM into a voice signal.

8. A mobile telephone device according to claim 1 in which the control means is a microprocessor containing a central processing device and a memory for storing the calling party's telephone number.

9. A mobile telephone device comprising:

an antenna for transmitting or receiving a first high frequency signal having a voice signal or a control signal modulated thereon and for receiving a second high frequency signal having a paging signal modulated thereon;

receiver means connected to the antenna and the below recited control means for demodulating the first high frequency signal received by said antenna into a base band signal;

transmitter means connected to the antenna and the below recited control means for modulating either a voltage signal or a base band signal of a control signal to generate an outgoing signal of the first high frequency signal via the antenna;

paging signal receiver means connected to the antenna for extracting a paging signal from the second high frequency signal received by said antenna;

data modulation/demodulation means connected to said transmitter means and receiver means for converting either an incoming control signal or an outgoing digital control signal received by or to be output from the antenna;

frequency synthesizer means for providing a tuned frequency for said transmitter means and receiver means and connected therebetween;

voice inputting means and voice outputting means for inputting and outputting voice signals into and from said device:

voice signal processing means for processing voice signals inputted from the voice inputting means to output it to said transmitter means and further processing a base band signal inputted from said receiver means to output it to said voice outputting means;

operator input means for inputting a transfer telephone number associated with a telephone at a remote location and to input an energization and completion signal to a control means within the device;

display means for displaying a calling party's telephone number received by the paging signal receiver means;

control means for acknowledging a paging signal inputted from said paging signal receiver means and displaying a calling party's telephone number on said display means;

synthetic voice generator means for storing numerical data convertible to voice signal data and outputting the voice signal data to said voice signal processing means as a voice signal;

transferring means contained in said control means for storing a transfer telephone number associated with a remote telephone device inputted to said operator input means and the calling party's telephone number detected in the paging signal by said paging signal receiver means, and outputting said transfer telephone number to said data modulation/demodulation means as said outgoing digital control signal in response to an energization signal inputted from said operator input means;

voice responding means contained in said control means for outputting a series of numbers corresponding to said calling party's telephone number to said synthetic voice generator means;

power supply means for supplying electrical power to said telephone device, said power supply means being connected to each of the foregoing means of the mobile telephone device; and power supply control means for shutting off the supply of electrical power from said power supply means to at least the frequency synthesizer means when waiting for an incoming paging signal.

10. A mobile telephone device according to claim 9 wherein the paging receiver means comprises a paging receiving filter for extracting a high frequency signal containing a paging signal from the second high frequency signal received by said antenna, paging demodulator means demodulating an output signal from the paging receiving filter to a base band signal, and paging convertor means for converting said base band signal into a digital signal to output it to said control means.

11. A mobile telephone device according to claim 9 in which the control means includes a calling party's telephone number reserving means for reserving said calling party's telephone number on said display means.

12. A mobile telephone device according to claims 9 or 11 wherein a ringing element connected to said control means is provided and the control means includes ringing means for driving said ringing element until said energization signal is inputted or for a specified period of time.

13. A mobile telephone device according to claim 9 in which the power supply control means includes instruction means for shutting off electrical power to at least said frequency synthesizer from said power supply means upon completion of communication with a party.

14. A mobile telephone device according to claim 9 wherein the voice responding means includes a ROM storing data having a voice message converted to a code, and a decoding LSI for decoding the coded data within the ROM to a voice signal.

15. A mobile telephone device according to claim 9 in which the control means is a microprocessor circuit including a central processor and a memory for storing said calling party's telephone number and said transfer telephone number.

16. A mobile telephone device comprising:

a main body for containing, an antenna for transmitting or receiving a first high frequency signal having a voice signal or a control signal modulated thereon and receiving a second high frequency signal having a paging signal modulated thereon;

receiver means connected to the antenna and the below recited control means for demodulating the first high frequency signal received with said antenna to a base band signal;

transmitter means connected to the antenna and the below recited control means for modulating a base band signal of either a voice signal or a control signal to generate an outgoing signal of the first high frequency via the antenna;

paging signal receiver means connected to the antenna for extracting a paging signal from a second high frequency signal received by said antenna;

data modulation/demodulation means connected to said transmitter means and receiver means for converting either an incoming control signal or an outgoing digital control signal received by or to be output from the antenna;

frequency synthesizer means for providing a tuned frequency to said transmitter means and receiver means and connected therebetween;

voice signal processing means for processing an inputted voice signal to output it to said transmitter means, and processing a base band signal inputted from said receiver means to output it as a voice signal;

control means including instantaneous calling means for detecting a calling party's telephone number in a paging signal outputted by said paging signal receiver means and for outputting said calling party's telephone number to said data modulation/demodulation means as said outgoing digital control signal in response to an inputted energization signal from the below recited operator input means;

power supply means for supplying electrical power to said telephone device, said power supply means being connected to each of the foregoing means in the main body of the device and each means in the below recited handset;

power supply control means for shutting off the supply of electrical power from said power supply means to at least said frequency synthesizer means when waiting for an incoming paging signal;

a handset containing, said operator input means connected to said control means for inputting an energization signal and a terminating signal thereto;

display means connected to the control means for displaying a calling party's telephone number received by said control means from said paging signal receiver means;

handset control means for acknowledging a signal inputted from said operator input means to output it to said control means and for displaying the calling party's telephone number inputted from said control means to said display means;

voice inputting means and voice outputting means for use in inputting and outputting voice signals to and from said device;

handset voice signal processing means for processing voice signals inputted from said voice inputting means to output said voice signal and for supplying a voice signal inputted from said voice signal inputting means to said voice outputting means; and handset power supply control means for shutting off the supply of electrical power from said power supply means to at least said handset voice signal processing means before performing a call to said calling party.

17. A mobile telephone device according to claim 16 in which the paging receiver means includes a paging receiving filter for extracting a high frequency signal containing a paging signal from the second high frequency signal received with said antenna, paging demodulator means for demodulating an output signal from the paging receiving filter to a base band signal, and paging converter means for converting said base band signal into a digital signal and outputting it to said control means.

18. A mobile telephone device according to claim 16 wherein the control means includes a calling party's telephone number reserving means for reserving said calling party's telephone number on said display means in the event that an energization signal is not detected from said handset control means within a specified period of time of receipt of a paging signal.

19. A mobile telephone device according to claims 16 or 18 wherein a ringing element is connected to said handset control means, and the handset control means includes ringing means for instructing said ringing element until the generation of said energization signal or for a specified period of time.

20. A mobile telephone device according to claim 16 in which the control means includes instructing means for giving an instruction for shutting off electrical power to at least said frequency synthesizer means from said power supply means upon completion of communication, and said handset controlling means includes a handset instructing means for shutting off the supply of electrical power to at least said handset voice signal processing means from said handset power supply means upon completion of the communication.

21. A mobile telephone device according to claim 16 wherein there is provided a voice responding means connected to said control means to store a voice message and to output this voice message to said voice signal processing means, and voice responding means being contained in said control means to give an instruction to output said voice message after a calling operation through said instantaneous calling means.

22. A mobile telephone device according to claim 21 in which the voice responding means includes a ROM storing data having coded voice messages and a decoding LSI for decoding the coded data within the ROM to a voice signal.

23. A mobile telephone device according to claim 16 in which the control means is a microprocessor circuit including a central processor and a memory for storing said calling party's telephone number, and the handset control means is a microprocessor circuit including a central processor.

24. A mobile telephone device comprising:

a main body containing, an antenna for transmitting or receiving a first high frequency signal having a voice signal or a control signal modulated thereon and receiving a second high frequency signal having a paging signal modulated thereon;

receiver means connected to the antenna and the below recited control means for demodulating the first high frequency signal received with said antenna to a base band signal;

transmitter means connected to the antenna and the below recited control means for modulating either a voice signal or a base band signal or a control signal to generate an outgoing signal of the first high frequency via the antenna;

paging signal receiver means connected to the antenna for extracting a paging signal from the second high frequency signal received by said antenna;

data modulation/demodulation means connected to said transmitter means and receiver means for converting either an incoming control signal or an outgoing digital control signal received by or to be output from the antenna;

frequency synthesizer means for providing a tuned frequency to said transmitter means and receiver means and connected therebetween;

voice signal processing means for processing an inputted voice signal to output it to said transmitter means and to process a base band signal inputted from said receiver means to output it as a voice signal;

synthetic voice generator means connected to the voice signal processing means for storing numerical data convertible to voice signal data and outputting this data as a voice signal to said voice signal processing means;

control means including transferring means for storing a transfer telephone number associated with a remote telephone inputted to the below recited operator input means contained in the below recited handset and storing a calling party's telephone number detected in the paging signal outputted by said paging signal receiver means and outputting said calling party's telephone number to said data modulation/demodulation means as said outgoing digital control signal in response to an inputted energization signal from said operator input means;

voice responding means included in said control means for outputting a series of numbers corresponding to said calling party's telephone number to said synthetic voice generator means after calling operation is performed through said transferring means;

power supply means for supplying electrical power to said telephone device, said power supply means being connected to each of the foregoing means in the main body of the device and each means in the below recited handset; and power supply control means for shutting off the supply of electrical power to at least said frequency synthesizer means while waiting for receipt of a paging signal;

a handset containing, said operator input means for inputting to said control means a transfer telephone number associated with the remote telephone and further inputting an energization signal and a terminating signal;

display means connected to the control means for displaying a calling party's telephone number received by said control means from said paging signal receiver means;

handset control means for outputting the transfer telephone number inputted from said operator input means and the energization signal to said control means and displaying the calling party's telephone number on said display means;

voice inputting means and voice outputting means for inputting and outputting voice signals to and from said handset;

handset voice signal processing means for processing a voice signal inputted form the voice inputting means to output it to said voice signal processing means and providing a voice signal inputted from said voice signal processing means to said voice outputting means; and handset power supply control means for shutting off the supply of power from said power supply means to at least said handset voice signal processing means when waiting for a paging signal.

25. A mobile telephone device according to claim 24 wherein the paging receiver means includes a paging receiving filter for extracting a high frequency signal containing a paging signal from the second high frequency signal received with said antenna;

signal of the paging receiving filter to the base band signal; and paging converter means for converting said base band signal into a digital signal and outputting it to said control means.

26. A mobile telephone device according to claim 24 in which the control means includes calling party's telephone number restoring means for instructing said calling party's telephone number to be reserved in the display means of handset.

27. A mobile telephone device according to claim 24 wherein a ringing element connected to said handset control means is provided, and the handset control means includes ringing means for driving said ringing element until said energization signal is inputted or for a specified period of time.

28. A mobile telephone device according to claim 24 in which the control means includes instructing means for giving an instruction to shut off electrical power to at least said frequency synthesizer means upon completion of communication with the calling party, and said handset control means includes handset instructing means for giving an instruction to shut off electrical power to at least said handset voice signal processing means upon termination of communication with the calling party.

29. A mobile telephone device according to claim 24 in which the synthetic voice generating means includes a ROM storing data having a coded voice message, and a decoding LSI for decoding the coded data in the ROM to a voice signal.

30. A mobile telephone device according to claim 24 in which the controlling means is a microprocessor including a central processor and a memory storing said calling party's telephone number and said transferred telephone number, and the handset controlling means is a microprocessor including a central processing device.

31. A mobile telephone device comprising:

a main body for containing, an antenna for receiving a first high frequency having a voice signal or a control signal modulated thereon;

receiver means connected to the antenna and the below recited control means for demodulating a first high frequency signal received with said antenna to a base band signal;

transmitter means connected to the antenna and the below recited control means for modulating either a voice signal or a base band signal of a controlling signal to generate a first high frequency signal via the antenna;

data modulation/demodulation means connected to said transmitter means and receiver means for converting either an incoming control signal or an outgoing digital control signal received by or to be output from the antenna;

frequency synthesizer means providing a tuned frequency to said receiver means and transmitter means and connected therebetween;

voice signal processing means for processing an inputted voice signal to output it to said transmitter means and for processing a base band signal inputted from said receiver means to output it as a voice signal;

control means including instantaneous calling means for outputting a calling party's telephone number received from said paging signal receiver means to said data modulation/demodulation means as said outgoing digital control signal in response to an energization signal;

simplified wireless means connected to said control means and voice signal processing means for receiving a control signal modulated to a third high frequency signal to output it to said instantaneous calling means, for modulating a voice signal outputted from said voice signal processing means to said third high frequency signal to output it, and for inputting the voice signal modulated into said third high frequency signal to output it to said voice signal processing means;

a simplified wireless antenna for transmitting the third high frequency signal outputted from said simplified wireless means, receiving the third high frequency signal to output it to said simplified wireless means;

power supply means for supplying electrical power to each of the means contained within the main body; and power supply control means for shutting off the supply of electrical power from said power supply means to at least said frequency synthesizer means when waiting for the receipt of an incoming call, a handset for containing, operator input means for inputting an energization signal and a termination signal to the below recited handset control means;

display means connected to said handset control means for displaying a calling party's telephone number;

a handset antenna for receiving a second high frequency signal having a paging signal modulated thereon, transmitting or receiving a third high frequency signal having a voice signal or a control signal modulated thereon;

paging signal receiver means connected to said handset antenna for extracting a paging signal from the third high frequency signal received by said handset antenna;

handset control means for detecting a calling party's telephone number in a paging signal outputted by said paging signal receiver means and for recognizing an energization signal inputted from said operator input means;

voice inputting means and voice outputting means for inputting or outputting voice signals to or from the handset;

voice signal processing means for processing a voice inputted from said voice inputting means and providing an inputted voice signal to said voice outputting means;

handset simplified wireless means for modulating an energization signal outputted from said handset control means and a calling party's telephone number into said third high frequency signal as a control signal, or modulating a voice signal outputted from said handset voice signal processing means onto said third high frequency signal to output it to said handset antenna, and then modulating the third high frequency signal received with said handset antenna having a voice signal modulated thereon to output the voice signal to said handset voice signal processing means;

handset power supply means for supplying electrical power to each of the means within said handset; and handset power supply control means for shutting off the supply of electrical power from said handset power supply means to at least sand handset voice signal processing means when waiting for receipt of a paging signal.

32. A mobile telephone device according to claim 31 wherein the paging receiver means includes a paging receiver filter for extracting a high frequency signal containing a paging signal from the second high frequency signal received with said handset antenna, paging demodulator means for demodulating an output signal of the paging receiver filter to a base band signal, and paging demodulator means for converting said base band signal to a digital signal to output it to said handset control means.

33. A mobile telephone device according to claim 31 wherein said control means in said main housing includes calling party's telephone number receiving means for reserving said calling party's telephone number in said display means of said handset via said simplified wireless means and handset simplified wireless means in the event that an energization signal is not received from said simplified wireless means within a specified period of time from receipt of a paging signal.

34. A mobile telephone device according to claims 31 or 33 wherein the handset includes a ringing element, and the handset control means includes ringing means for driving said ringing element until a return call is initiated by the energization signal or for a specified period of time.

35. A mobile telephone device according to claim 31 wherein the control means includes instruction means for shutting off the supply of electrical power to at least said frequency synthesizer means from said power supply means upon completion of communication with a calling party and said handset control means includes handset instruction means for shutting off the supply of electrical power from said handset power supply means to at least said handset voice signal processing means upon completion of the communication with the calling party.

36. A mobile telephone device according to claim 31 in which simplified wireless means and handset simplified wireless means include a cordless transmitting or receiving machine for receiving a signal by using a frequency of each of cordless telephones.

37. A mobile telephone device according to claim 31 wherein there is provided voice responding means for storing a voice message and outputting this voice message to said voice signal processing means as a voice signal, and additional voice responding means within said control means for giving an instruction to output said voice message in response to the generation of an energization signal from said instantaneous calling means.

38. A mobile telephone device according to claim 37 wherein the voice responding means includes a ROM storing coded data of voice messages and a decoding LSI for decoding coded data in the ROM to a voice signal.

39. A mobile telephone device according to claim 31 wherein the control means is a microprocessor circuit including a central processor and a memory for storing said calling party's telephone number, and the handset control means is a microprocessor circuit including a central processor.

40. A mobile telephone device according to claim 31 wherein the power supply means is a battery mounted in a vehicle.

41. A mobile telephone device comprising:

a main body containing, an antenna for receiving a first high frequency signal having a voice signal for a control signal modulated thereon;

receiver means connected to the antenna and the below recited control means for modulating a first high frequency signal received by said antenna to a base band signal;

transmitter means connected to the antenna and the below recited control means for modulating either the voice signal or a base band signal of a control signal to generate an outgoing signal of the first high frequency via the antenna;

data modulation/demodulation means connected to said transmitter means and receiver means for converting either said incoming control signal or an outgoing digital control signal received by or to be output from the antenna;

frequency synthesizer means for providing a tuned frequency to said receiver means and transmitter means and connected therebetween;

voice signal processing means for processing an inputted voice signal to output it to said transmitter means and for processing the base band signal inputted from said receiver means to output it as a voice signal;

synthetic voice generator means connected to the voice signal processing means for storing numerical data convertible to voice signal data and for outputting the voice signal data to said voice signal processing means as a voice signal;

control means including transferring means storing an inputted transfer telephone number associated with a remote telephone and a calling party's telephone number received from the below recited paging signal receiver means within the below recited handset and for outputting said transfer telephone number as said outgoing digital control signal to said data modulation/demodulation means in response to an inputted energization signal;

voice responding means included in said control means for outputting a series of numbers corresponding to said calling party's telephone number to said synthetic generating means after a call placed through said transferring means is performed;

simplified wireless means connected to said control means for receiving a control signal modulated to a third high frequency signal to output it to said transferring means, modulating a voice signal outputted from said voice signal processing means to said third high frequency to output it, and inputting a voice signal modulated to said third high frequency signal to output it to said voice signal processing means;

an output simplified wireless antenna for transmitting a third high frequency signal outputted from said simplified wireless means, receiving the third high frequency signal to output it from said simplified wireless means;

power supply means for supplying electrical power to each of the means within the main body; and power supply control means for shutting off the supply of electrical power to at least said frequency synthesizer when waiting for a paging signal;

a handset containing, operator input means for inputting a transfer telephone number associated with a remote telephone and inputting the calling party's telephone number received by the below recited paging signal receiver means and inputting an energization signal and a termination signal;

display means connected to the below recited handset control means for displaying the calling party's telephone number;

a handset antenna for receiving a second high frequency signal having a paging signal modulated thereon, transmitting or receiving a third high frequency signal having a voice signal or a control signal modulated thereto;

paging signal receiver means for extracting a paging signal from the third high frequency signal received with said handset antenna;

handset control means for detecting a calling party's telephone number in a paging signal outputted by said paging signal receiver means and recognizing an energization signal inputted from said operator input means;

voice inputting means and voice outputting means for inputting and outputting voice signals from said handset;

handset voice signal processing means for processing a voice inputted from said voice inputting means and providing an inputted voice signal to said voice outputting means;

handset simplified wireless means for modulating an energization signal outputted from said handset control means, a calling party's telephone number and a transfer telephone number to said third high frequency signal as a control signal, or modulating a voice signal outputted from said handset voice signal processing means to said third high frequency signal to output it to said handset antenna, and at the same time for demodulating a third high frequency signal received with said handset antenna having a voice signal modulated thereon and for outputting it to said handset voice signal processing means;

handset power supply means for supplying electrical power to each means in the handset; and handset power supply control means for shutting off said handset power supply before a calling operation.

42. A mobile telephone device according to claim 41 wherein the paging receiving means includes a paging receiver filter for extracting a paging signal from the second high frequency signal received with said handset antenna, paging demodulator means demodulating an output signal of the paging receiver filter to a base band signal, and paging converter means for converting said base band signal into a digital signal and outputting it to said control means.

43. A mobile telephone device according to claim 41 wherein the control means includes calling party's telephone number reserving means for reserving said calling party's telephone number on said display means in the event that said simplified wireless means does not receive an energization signal for a specified period of time after receipt of a paging signal.

44. A mobile telephone device according to claims 41 or 43 wherein the handset includes a ringing element, the control means includes ringing means from driving said ringing element through said simplified wireless means and the handset controlling means until said energization signal is inputted or for a specified period of time.

45. A mobile telephone device according to claim 41 wherein the control means includes instructing means to give an instruction to shut off electrical power to at least said frequency synthesizer from said power supply means upon completion of communication, and said handset control means includes handset instructing means to give an instruction to shut off the supply of electrical power to at least said handset voice signal processing means from said handset power supply means upon completion of communication.

46. A mobile telephone device according to claim 41 wherein the simplified wireless means and the handset simplified wireless means include cordless transmitting and receiving machines for receiving a signal by using the frequencies of the third high frequency signal.

47. A mobile telephone device according to claim 41 wherein the voice responding means includes a ROM staring data having voice message coded therein and a decoding LSI for decoding the coded data within the ROM.

48. A mobile telephone device according to claim 41 wherein the control means is a microprocessor including a central processor and a memory storing said calling party's telephone number and said transfer telephone number, and the handset control means is a microprocessor circuit including a central processor device.

49. A mobile telephone device according to claim 41 wherein the power supply means is a battery to be mounted in a vehicle.

50. A mobile telephone device comprising:

an antenna for receiving and transmitting high frequency communication signals;

operator input/output means for enabling an operator to input data or voice communications into said telephone device or receive data or voice communications from the device via said antenna, said input/output means including, means for generating a standby signal for initiating a call waiting period in which the telephone device can receive incoming calls, and means for generating a transmit signal for initiating a voice transmission period in which the telephone device can transmit and receive voice and data communications;

control means connected to said operator input/output means for receiving said standby and transmit signals to place said telephone device in either standby or voice transmission modes, respectively;

first signal processor means connected to said antenna and said control means for receiving and transmitting voice and data communication signals from and to the antenna and transporting said voice and data communication signals between the antenna and the control means, said first signal processor means having a first power consumption level when energized by electrical power;

second signal processor means connected to said antenna and said control means for receiving data communication signals of incoming calls from the antennae and transporting the data communication signals from the antenna to the control means, said second signal processor means having a second power consumption level when energized by electrical power which is lower than the first power consumption level of the first processor means;

power supply means connected to each of the above-recited means for energizing the telephone device with electrical power; and power supply control means, responsive to the control means placing the telephone device in the standby mode, for selectively supplying said electrical power only to said operator input/output means, control means and second signal processor means, and responsive to the control means placing the telephone device in a voice transmission mode, for also supplying said electrical power to said first signal processor means.

51. The mobile telephone device of claim 50 wherein said control means includes:

phone number identification means for analyzing the data communication signals of incoming calls processed by said second signal processor means and identifying a telephone number of a calling party that made the incoming call;

memory means for storing the telephone number of the calling party; and readout means for retrieving the telephone number of the calling party from the memory means, and applying the number to said first signal processor means during the voice transmission mode responsive to the generation of a transmit signal from said operator input/output means in order to initiate a return call to the calling party.

52. The mobile telephone device of claim 51 wherein said operator input/output means includes:

display means for displaying the telephone number of the calling party identified by the control means and stored in the memory means.

53. The mobile telephone device of claim 50 wherein said operator input/output means includes:

display means for displaying message data contained in incoming calls processed by said second signal processor means.

54. The mobile telephone device of claim 50 further comprising:

synthetic voice generator means for generating selected voice messages and applying said messages to said first signal processor means; and means within the control means for detecting the receipt of an incoming call and automatically outputting a transmit signal from said control means if a transmit signal has not been generated by said operator input/output means within a predetermined time of receipt of an incoming call, said transmit signal output from said control means placing the telephone device in a voice transmission mode and causing the transmission of a selected voice message from the synthetic voice generator means via the first signal processor means to the calling party.

55. The mobile telephone device of claim 51 further comprising:

synthetic voice generator means for generating selected voice messages and applying said messages to said first signal processor means; and means within the control means for detecting the receipt of an incoming call and automatically outputting a transmit signal from said control means if a transmit signal has not been generated by said operator input/output means within a predetermined time of receipt of an incoming call, said transmit signal output from said control means placing the telephone device in a voice transmission mode and causing the transmission of a selected voice message from the synthetic voice generator means via the first signal processor means to the calling party.

56. The mobile telephone device of claim 50 further comprising:

synthetic voice generator means for generating selected voice messages and applying said messages to said first signal processor means;

said control means including, phone number identification means for analyzing the data communication signals of incoming calls processed by said second signal processor means and identifying a telephone number of a calling party that made the incoming call;

said operator input/output means including means for inputting a transfer telephone number to which incoming call data can be transferred;

memory means for storing the calling party's telephone number and the transfer telephone number to which said incoming call data can be transferred; and readout means for retrieving both the calling party and transfer telephone numbers from the memory means;

said control means applying signals retrieved by the readout means related to the calling party's telephone number to said synthetic voice generating means in order to apply synthetic voice signals, capable of enunciating the calling party's telephone number, to said first signal processor means;

said control means also applying signals retrieved by said readout means related to said transfer telephone number to said first signal processor means in order to initiate voice communication to a remote telephone device having said transfer telephone number, said communication including synthetic voice enunciation at the remote telephone device of the calling party's telephone number.

57. The mobile telephone device of claim 56, wherein said control means also causes said synthetic voice generator means to apply selected voice messages in addition to the calling party's telephone number to said first signal processor means.

58. The mobile telephone device of claim 50 wherein the high frequency communication signals received or transmitted by said antenna include first high frequency signals and second high frequency signals of different respective frequencies, said first processor means processing only said first high frequency signals and said second processing means processing only said second high frequency signals.

59. A mobile telephone device according to claim 58 wherein said second signal processor means comprises a filter for extracting the second high frequency signals received by said antenna, means for converting the output signal of the filter to a base band signal and demodulator means for converting said base band signal into a digital signal and outputting said digital signal to said control means.

60. A mobile telephone device according to claims 50 or 58 in which a ringing element connected to said control means is provided and the control means includes ringing means for driving said ringing element either until said transmit signal is inputted or for a specified period of time.

61. A mobile telephone device according to claims 50 or 58 in which the control means includes instructing means for giving an instruction to the power supply control means to shut off the supply of electrical power to the telephone device upon completion of communication of the voice transmission mode.

62. A mobile telephone device according to claim 54 in which the synthetic voice generating means includes ROM having data coded with a voice message and a demodulation LSI for demodulating the coded data within the ROM into a voice signal.

63. A mobile telephone device according to claims 50 or 58 in which the control means is a microprocessor containing a central processing device and a memory for storing said calling party's telephone number.

64. A communication system comprising:

a mobile telephone device having a main body containing, a first antenna for receiving and transmitting high frequency communication signals;

operator input/output means for enabling an operator to input data or voice communications into said telephone device or receive data or voice communications from the device via said first antenna; said input/output means including, means for generating a transmit signal for initiating a voice transmission mode in which the telephone device can transmit and receive voice and data communications, and means for generating a receive signal for initiating a standby mode in which the telephone device can receive incoming calls;

first control means connected to said operator input/output means for receiving said standby and transmit signals to place said telephone device in either standby or voice transmission modes, respectively;

first signal processor means connected to said first antenna and said first control means for receiving and transmitting voice and data communication signals from and to the first antenna, and transporting said voice and data communication signal between the first antenna and the first control means, said first signal processor means having a first power consumption level when energized by electrical power;

first data input/output means for feeding data into and out of said main body to and from said first control means;

power supply means connectable to each of the above-recited first means for energizing the telephone device with electrical power; and power supply control means, responsive to the first control means placing the telephone device in the standby mode, for selectively supplying said electrical power only to said operator input/output means and first control means and responsive to the first control means placing the telephone device in a voice transmission mode, for also supplying said electrical power to said first signal processor means;

a separate receiver device containing, a second antenna for receiving high frequency communication signals;

second signal processor means connected to said second antenna and said second control means for receiving data communication signals of incoming calls from the second antenna and transporting the data communication signals from the antenna to a second control means in the separate receiver device, said second signal processor means having a second power consumption level when energized by electrical power which is lower than the first power consumption level of the first processor means;

second power supply means for supplying electrical power to said second signal processor means and connected thereto; and second data input/output means connected to said first input/output data means and said second control means.

65. The communication system of claim 64 wherein each of said first and second control means include:

phone number identification means for analyzing the data communication signals of incoming calls processed by said second signal processor means and identifying a telephone number of a calling party that made the incoming call;

memory means for storing the telephone number of the calling party; and readout means for retrieving the telephone number of the calling party from the memory means, and applying the number to said first signal processor means during the voice transmission mode responsive to the generation of a transmit signal from said operator input/output means in order to initiate a return call to the calling party.

66. The communication system of claim 65 wherein said operator input/output means includes:

display means for displaying the telephone number of the calling party identified by the first control means and stored in the memory means associated therewith.

67. The communication system of claim 64 wherein said operator input/output means includes:

display means for displaying message data contained in incoming calls processed by said second signal processor means.

68. The communication system of claim 64 further comprising:

synthetic voice generator means for generating selected voice messages and applying said messages to said first signal processor means; and means within the first control means for detecting the receipt of an incoming call and automatically outputting a transmit signal to said control means if a transmit signal has not been generated by said operator input/output means within a predetermined time of receipt of an incoming call, said transmit signal output from said control means placing the telephone device in a voice transmission mode and causing the transmission of a selected voice message from the synthetic voice generator means via the first signal processor means to the calling party.

69. The communication system of claim 65 further comprising:

synthetic voice generator means for generating selected voice messages and applying said messages to said first signal processor means; and means within the first control means for detecting the receipt of an incoming call and automatically outputting a transmit signal to said control means if a transmit signal has not been generated by said operator input/output means within a predetermined time of receipt of an incoming call, said transmit signal output from first control means placing the telephone device in a voice transmission mode and causing the transmission of a selected voice message from the synthetic voice generator means via said first signal processor means to the calling party.

70. The communication system of claim 64 further comprising:

synthetic voice generator means for generating selected voice messages and applying said messages to said first signal processor means;

said first control means including, phone number identification means for analyzing the data communication signals of incoming calls processed by said second signal processor means and identifying a telephone number of a calling party that made the incoming call;

said operator input/output means including means for inputting a transfer telephone number associated with a remote telephone device to which incoming call data can be transferred;

memory means for storing the calling party's telephone number and the transfer telephone number to which said incoming call data can be transferred; and readout means for retrieving both the calling party and transfer telephone numbers from the memory means;

said first control means applying signal retrieved from the readout means related to the calling party's telephone number to said synthetic voice generating means in order to apply synthetic voice signals, capable of enunciating the calling party's telephone number, to said first signal processor means;

said first control means also applying signals retrieved by said readout means related to said transfer telephone number to said first signal processor means in order to initiate voice communication to the remote telephone device having said transfer telephone number, said communication including synthetic voice enunciation at the remote telephone device of the calling party's telephone number.

71. The communication system of claim 70 wherein said first control means also causes said synthetic voice generator means to apply selected voice messages in addition to the calling party's telephone number to said first signal processor means.

72. The communication system of claim 64 wherein the high frequency communication signals received or transmitted by the respective antenna include first high frequency signals and second high frequency signals of different respective frequencies, said first processor means processing only said first high frequency signals and said second processing means processing only said second high frequency signals.

73. A communication system according to claim 64 or 72 wherein said second signal processing means comprises a filter for extracting the second high frequency signals received by said antenna, means for coverting the output signal of the filter to a base band signal and demodulator means for converting said base band signal into a digital signal and outputting said digital signal to said control means.

74. A communication system according to claims 64 or 66 in which a ringing element connected to said control means is provided and the control means includes ringing means for driving said ringing element either until said transmit signal is inputted or for a specified period of time.

75. A communication system according to claims 64 or 72 in which the first control means includes instructing means for giving an instruction to the power supply control means to shut off the supply of electrical power to the telephone device upon completion of the voice transmission mode.

76. A mobile telephone device according to claim 68 in which the synthetic voice generating means includes ROM having data coded with a voice message and a demodulation LSI for demodulating the coded data within the ROM into LSI for demodulating the coded data within the ROM into a voice signal.

77. A communication system according to claims 64 or 72 in which the control means is a microprocessor containing a central processing device and a memory for storing said calling party's telephone number.

78. A mobile telephone device comprising:

an antenna for receiving and transmitting high frequency communication signals;

control means connected in circuit with said antenna for processing signals related to the communication signals;

transceiver means connected to said antenna and said control means for receiving and transmitting voice and data communication signals from and to the antenna, and transporting said voice and data communication signals between the antenna and the control means, said transceiver means having a first power consumption level when energized by electrical power;

receiver means connected to said antenna and said control means for receiving incoming call data signals from the antenna from a calling party and transporting the data communication signals from the antenna to the control means, said receiver means having a second power consumption level when energized by electrical power which is lower than the first power consumption level of the processor means;

power supply means connected to each of the above-recited means for energizing the telephone device with electrical power; and power supply control means for blocking the supply of electrical power to the transceiver means when waiting for the incoming data communication signals received by said receiver means.

79. The mobile telephone device of claim 78 wherein said control means includes:

phone number identification means for analyzing the data communication signals of incoming calls processed by said receiver means and identifying a telephone number of a calling party that made the incoming call;

memory means for storing the telephone number of the calling party; and readout means for retrieving the telephone number of the calling party from the memory means, and applying the number to said transceiver means in order to initiate a return call to the calling party.

80. The mobile telephone device of claim 79 wherein said control means includes:

display means for displaying the telephone number of the calling party identified by the control means and stored in the memory means.

81. The mobile telephone device of claim 78 wherein said control means includes:

means for displaying message data contained in incoming calls processed by said receiver means 82. The mobile telephone device of clam 78 wherein the high frequency communication signals received or transmitted by said antenna include first high frequency signals and second high frequency signals of different respective frequencies, said transceiver means processing only said first high frequency signals and said receiver means processing only said second high frequency signals.

83. A mobile telephone device according to claim 82 wherein said receiver means comprises a filter for extracting the second high frequency signals received by said antenna, means for converting the output signal of the filter to a base band signal and demodulator means for converting said base band signal into a digital signal and outputting said digital signal to said control means.

84. A mobile telephone device according to claims 78 or 82 in which a ringing element connected to said control means is provided and the control means includes ringing means for driving said ringing element for a specified period of time.

85. A mobile telephone device according to claims 78 or 82 in which the control means includes instructing means for giving an instruction to the power supply control means to shut off the supply of electrical power to the telephone device upon completion of communication with a calling party.

86. A mobile telephone device comprising:

an antenna for receiving and transmitting high frequency communication signals;

control means connected in circuit with the antenna for processing signal related to the communications signals;

first signal processing means connected to said antenna and said control means for receiving and transmitting voice and data communication signals from and to the antenna, and transporting said voice and data communication signals between the antenna and the control means, said first signal processing means having a first power consumption level when energized by electrical power;

paging signal processing means connected to said antenna and said control means for receiving paging signals within incoming calls from the antenna and transporting the data communication signals from the antenna to the control means, said paging signal processing means having a second power consumption level when energized by electrical power which is lower than the first power consumption level of the first signal channel means;

power supply means connected to each of the above-recited means for energizing the telephone device with electrical power; and power supply control means for blocking the supply of electrical power to said first signal processor means when waiting for receipt of a paging signal.

87. The mobile telephone device of claim 86 wherein said control means includes:

phone number identification means for analyzing the paging signals of incoming calls received by said paging signal processing means and identifying a telephone number of a calling party that made the incoming call;

memory means for storing the telephone number of the calling party; and readout means for retrieving the telephone number of the calling party from the memory means and applying the number to said first signal processing means in order to initiate a return call to the calling party.

88. The mobile telephone device of claim 87 wherein said control means includes:

display means for displaying the telephone number of the calling party identified by the control means and stored in the memory means.

89. The mobile telephone device of claim 86 wherein said control means includes:

display means for displaying message data contained in incoming calls processed by said paging signal channel means.

90. The mobile telephone device of claim 86 wherein the high frequency communication signals received or transmitted by said antenna include first high frequency signals and second high frequency signals of different respective frequencies, said first signal processing means processing only said first high frequency signals and said paging signal processing means processing only said second high frequency signals.

91. A mobile telephone device according to claim 90 wherein said paging signal processing means comprises a filter for extracting the second high frequency signals received by said antenna means for converting the output signal of the filter to a base band signal and (needs finished).

92. A mobile telephone device according to claims 86 or 90 in which a ringing element connected to said control means is provided and the control means includes ringing means for driving said ringing element for a specified period of time.

93. A mobile telephone device according to claims 86 or 90 in which the control means includes instructing means for giving an instruction to the power supply control means to shut off the supply of electrical power to the telephone device upon completion of communication with a calling party.

*94. A mobile telephone device comprising:*

*an antenna for receiving and transmitting high frequency communication signals;*

*control means for processing signals related to the communication signals;*

*first signal processing means connected to said antenna and said control means for receiving and transmitting voice and data communications signals from and to the antenna, and transporting said voice and data communication signals between the antenna and the control means; and*

*paging signal processing means connected to said antenna and said control means for receiving paging signals within incoming calls from the antenna and transporting the data communication signals from the antenna to the control means.*

*95. The mobile telephone device of claim 94 further comprising:*

*power supply control means for blocking the supply of electrical power to said first signal processor means when waiting for receipt of a paging signal.*

*96. A mobile telephone device according to claims 95 in which the control means includes instructing means for*

*giving an instruction to the power supply control means to shut off the supply of electrical power to the telephone device upon completion of communication with a calling party.*

*97. A mobile telephone device according to claims 94 in which a ringing element connected to said control means is provided and the control means includes ringing means for driving said ringing element for a specified period of time.*

*98. The mobile telephone device of claim 94 wherein said control means includes:*

*phone number identification means for analyzing the paging signals of incoming calls received by said paging signal processing means and identifying a telephone number of a calling party that made the incoming call;*

*memory means for storing the telephone number of the calling party; and*

*readout means for retrieving the telephone number of the calling party from the memory means and applying the number to said first signal processing means in order to initiate a return call to the calling party.*

*99. The mobile telephone device of claim 94 wherein said control means includes:*

*display means for displaying the telephone number of the calling party identified by the control means and stored in the memory means.*

*100. The mobile telephone device of claim 94 wherein said control means includes:*

*display means for displaying message data contained in incoming calls processed by said paging signal channel means.*

*101. The mobile telephone device of claim 94 wherein the high frequency communication signals received or transmitted by said antenna include first high frequency signals and second high frequency signals of different respective frequencies, said first signal processing means processing only said first high frequency signals and said paging signal processing means processing only said second high frequency signals.*

*102. A mobile telephone device according to claims 101 in which a ringing element connected to said control means is provided and the control means includes ringing means for driving said ringing element for a specified period of time.*

*103. A mobile telephone device according to claims 101 further comprising:*

*power supply control means for blocking the supply of electrical power to said first signal processor means when waiting for receipt of a paging signal: and*

*said control means includes instructing means for giving an instruction to the power supply control means to shut off the supply of electrical power to the telephone device upon completion of communication with a calling party.*

*104. A mobile telephone device comprising:*

*an antenna for transmitting or receiving a first high frequency signal having either a voice signal or a control signal modulated thereon and receiving a second high frequency signal having a paging signal modulated thereon;*

*receiver means connected to the antenna and the below recited control means for demodulating the first high frequency signal received with said antenna to a base band signal;*

*transmitter means connected to the antenna and the below recited control means for modulating a base band signal of either a voice signal or control signal to generate and outgoing signal of the first high frequency via the antenna;*

*paging signal receiver means connected to the antenna for extracting the paging signal from the second high frequency signal received by said antenna;*

*data modulation/demodulation means connected to said transmitter means and receiver means so as to convert either an incoming control signal or an outgoing digital control signal received by or to be output from the antenna;*

*frequency synthesizer means providing a tuned frequency for said transmitter means and receiver means and connected there between;*

*voice inputting means and voice outputting means for inputting and outputting voice signals into and from said device;*

*voice signal processing means for processing voice signals inputted from the voice inputting means to output it to said transmitter means and further processing a base band signal inputted from said receiving means to outputted to said voice outputting means;*

*operator input means for outputting control signals selected by an operator to a control means within the device;*

*display means for displaying a calling party's telephone number received by the paging signal receiver means;*

*said control means being responsive to a control signal from said operator input means for causing the display of the calling party's telephone number on said display means; and*

*instantaneous calling means contained in said operator input means, for detecting the calling party's telephone number in a paging signal outputted by said paging signal receiver means and outputting said calling party's telephone number as said outgoing digital control signal to said data modulation/demodulation means in response to an excitation signal inputted by an operator to said operation input means.*

*105. The mobile telephone device of claim 104 further comprising:*

*power supply control means connected to said power supply means for shutting off the supply of electrical power from said power supply means to at least said frequency synthesizer means when waiting for an incoming page.*

*106. A mobile telephone device comprising:*

*an antenna for transmitting or receiving a first high frequency signal having either a voice signal or a control signal modulated thereon and receiving a second high frequency signal having a paging signal modulated thereon;*

*receiver means connected to the antenna and the below recited control means for demodulating the first high frequency signal received with said antenna to a base band signal;*

*transmitter means connected to the antenna and the below recited control means for modulating a base band signal of either a voice signal or control signal to generate an outgoing signal of the first high frequency via the antenna;*

*paging signal receiver means connected to the antenna for extracting the paging signal from the second high frequency signal received by said antenna;*

*data modulation/demodulation means connected to said transmitter means and receiver means so as to convert*

*either an incoming control signal or an outgoing control signal received by or to be output from the antenna; and*

*instantaneous calling means for outputting a calling party's telephone number detected in the paging signal as said outgoing control signal.*

*107. A mobile telephone device according to claims 106 further comprising:*

*power supply means for supplying electrical power to said telephone device, said power supply means being connected to each of the foregoing means of the mobile telephone device.*

*108. A mobile telephone device according to claims 107 further comprising:*

*power supply control means connected to said power supply means for shutting off the supply of electrical power from said power supply means.*

*109. A mobile telephone device according to claims 107 further comprising:*

*frequency synthesizer means providing a tuned frequency for said transmitter means and receiver means and connected therebetween;*

*voice inputting means and voice outputting means for inputting and outputting voice signals into and from said device; and*

*power supply control means connected to said power supply means for shutting off the supply of electrical power from said power supply means to at least said frequency synthesizer means when waiting for an incoming paging signal.*

*110. A mobile telephone device according to claims 106 further comprising:*

*voice inputting means and voice outputting means for inputting and outputting voice signals into and from said device.*

*111. A mobile telephone device according to claims 106 further comprising:*

*phone number identification means for analyzing the paging signals of incoming calls received by said paging signal processing means and identifying a telephone number of a calling party that made the incoming call; and*

*memory means for storing the telephone number of the calling party.*

*112. A mobile telephone device comprising:*

*an antenna for transmitting or receiving a first high frequency signal having either a voice signal or a control signal modulated thereon and receiving a second high frequency signal having a paging signal modulated thereon;*

*receiver means connected to the antenna and the below recited control means for demodulating the first high frequency signal received with said antenna to a base band signal;*

*transmitter means connected to the antenna and the below recited control means for demodulating the first high frequency signal received with said antenna to a base band signal;*

*paging signal receiver means connected to the antenna for extracting the paging signal from the second high frequency signal received by said antenna;*

*data modulation/demodulation means connected to said transmitter means and receiver means so as to convert either an incoming control signal or an outgoing control signal received by or be to be output from the antenna; and*

*power supply control means connected to said power supply means for shutting off the supply of electrical power from said power supply means.*

*113. A mobile telephone device according to claim 112 further comprising:*

*voice inputting means and voice outputting means for inputting and outputting voice signals into and from said device.*

*114. A mobile telephone device comprising:*

*an antenna for receiving and transmitting high frequency communication signals;*

*control means connected to the antenna for processing signals related to the communication signals;*

*first signal processing means connected to said antenna and said control means for receiving and transmitting voice and data communication signals from and to the antenna, and transporting said voice and data communication signals between the antenna and the control means; and*

*second signal processing means connected to said antenna and said control means for receiving second signals including information of a calling party's telephone number within incoming calls from the antenna and transporting the data communication signals from the antenna to the control means.*

*115. A mobile telephone device comprising:*

*antenna means for transmitting or receiving a high frequency signal;*

*control means;*

*receiver means connected to the antenna means and said control means for demodulating the high frequency signal having a voice signal and a first signal including information of a calling party's telephone number;*

*transmitter means connected to the antenna means and said control means for modulating a second signal of either a voice signal or a control signal to generate an outgoing signal of the high frequency via the antenna means;*

*operator input means for outputting either an excitation signal or a telephone number signal selected by an operator;*

*memory means for storing the calling party's telephone number and a transferred party's telephone number;*

*response means for transmitting a code signal coding a calling party's telephone number to a transferred party in response to a command signal; and*

*display means for displaying the calling party's telephone number inputted from said control means;*

*said control means comprising:*

*detecting means for detecting the calling party's telephone number in the first signal;*

*display output means for outputting the calling party's telephone number detected by the detecting means to the display means;*

*memory output means for outputting the calling party's telephone number detected by the detecting means to the memory means;*

*instantaneous calling means for calling said calling party via said transmitter means and said antenna means by using the calling party's telephone number stored in said memory means in response to said excitation signal inputted by an operator to said operator input means; and*

*transfer means for calling the transferred party by using the transferred party's telephone number*

*stored in the memory means via the transmitter means and the antenna means and outputting the command signal to said response means.*

*116. A mobile telephone device comprising:*

*a handset;*

*a main body comprising:*

*antenna means for transmitting or receiving a high frequency signal;*

*first control means;*

*receiver means connected to the antenna means and said first control means for demodulating the high frequency signal having a voice signal or a first signal including information of a calling party's telephone number;*

*transmitter means connected to the antenna means and said first control means for modulating a second signal of either a voice signal or a control signal to generate an outgoing signal of the high frequency signal via the antenna means;*

*said first control means comprising means for detecting a calling party's telephone number in the first signal, for outputting the calling party's telephone number to said handset, and for calling said calling party by using said calling party's telephone number via said transmitter means in response to a excitation signal; and*

*memory means for storing the calling Party's telephone number detected by said first control means; and*

*said handset comprising:*

*second control means;*

*operator input means for outputting the excitation signal in response to operator's input;*

*display means for displaying the calling party's telephone number inputted from said second control means; and*

*said second control means comprising means for outputting the calling party's telephone number stored in said memory means to said display means via said first control means and for outputting the excitation signal outputted from said operator input means to said first control means.*

*117. A mobile telephone device comprising:*

*a handset;*

*a main body comprising:*

*antenna means for transmitting or receiving a high frequency signal;*

*first control means;*

*receiver means connected to the antenna means and said first control means for demodulating the high frequency signal having a voice signal and a first signal including information of a calling party's telephone number;*

*transmitter means connected to the antenna means and said first control means for modulating a second signal of either a voice signal or a control signal to generate an outgoing signal of the high frequency via the antenna means; and*

*said first control comprising means for detecting a calling party's telephone number in the first signal, for outputting the calling party's telephone number to said handset, and for calling the calling party by using said calling party's telephone number via said transmitter means in response to a excitation signal;*

*memory means for storing the calling party's telephone number detected by said first control means;*

*simplified antenna means;*

*simplified wireless means connected to said first control means and said simplified antenna means for receiving a control signal modulated to a second high frequency signal to output it to the first control means, for modulating signals from the first control means to the second high frequency signal to output it; and*

*said simplified antenna means comprising means for transmitting the second high frequency signal outputted from said simplified wireless means, receiving the second high frequency signal to output it to said simplified wireless means; and*

*said handset comprising:*

*second control means;*

*operator input means for outputting the excitation signal in response to operator's input;*

*display means for displaying the calling party's telephone number inputted from said second control means;*

*second control means comprising means for outputting the calling party's telephone number stored in said memory means to said display means via said first control means and for outputting the excitation signal outputted from said operator input means to said first control means;*

*handset simplified antenna means;*

*handset simplified wireless means for modulating signals outputted from said second control means into said second high frequency signal to output it to said handset simplified antenna means, and for demodulating the second high frequency signal received with said handset simplified antenna means to signals to output it to second control means; and*

*said handset simplified antenna means comprising means for transmitting the second high frequency signal outputted from said handset simplified wireless means and for receiving the second high frequency signal to output it to said handset simplified wireless means.*

*118. A mobile telephone device comprising:*

*control means;*

*antenna means for transmitting or receiving a high frequency signal;*

*receiver means connected to the antenna means and said control means for demodulating the high frequency signal having a voice signal and a first signal including information of a calling party's telephone number;*

*transmitter means connected to the antenna means and said control means for modulating a second signal of either a voice signal or a control signal to generate an outgoing signal of the high frequency via the antenna means;*

*operator input means for outputting an excitation signal;*

*memory means for storing the calling party's telephone number;*

*a display part for displaying the calling party's telephone number inputted from said control means in a similar fashion; and*

*said control means comprising:*

*detecting means for detecting the calling party's telephone number in the first signal;*

*display output means for outputting the calling party's telephone number detected by the detecting means to the display means;*

*memory output means for outputting the calling party's telephone number detected by the detecting means to the memory means; and*

*instantaneous calling means for calling said calling party via said transmitter means and said antenna means by using the calling party's telephone number stored in said memory means in response to said excitation signal inputted by an operator to said operator input means.*

*119. A mobile telephone device comprising:*

*control means;*

*antenna means for transmitting or receiving a high frequency signal;*

*receiver means connected to the antenna means and said control means for demodulating the high frequency signal having a voice signal and a first signal including information of a calling party's telephone number;*

*transmitter means connected to the antenna means and said control means for modulating a second signal of either a voice signal or a control signal to generate an outgoing signal of the high frequency via the antenna means;*

*operator input means for outputting an excitation signal;*

*memory means for storing the calling party's telephone number;*

*display means for displaying the calling party's telephone number inputted from said control means;*

*a ringing element connected to said control means; and*

*said control means comprising:*

*detecting means for detecting the calling party's telephone number in the first signal;*

*display output means for outputting the calling party's telephone number detected by the detecting means to the display means;*

*memory output means for outputting the calling party's telephone number detected by the detecting means to the memory means;*

*instantaneous calling means for calling said calling party via said transmitter means and said antenna means by using the calling party's telephone number stored in said memory means in response to said excitation signal inputted by an operator to said operator input means; and*

*ringing means for driving said ringing element either until said excitation signal is inputted or for a specified period of time.*

*120. A mobile telephone device comprising:*

*control means;*

*antenna means for transmitting or receiving a high frequency signal;*

*receiver means connected to the antenna means and said control means for demodulating the high frequency signal having a voice signal and a first signal including information of a calling party's telephone number;*

*transmitter means connected to the antenna means and said control means for modulating a second signal of either a voice signal or a control signal to generate an outgoing signal of the high frequency via the antenna means;*

*operator input means for outputting an excitation signal;*

*memory means for storing the calling party's telephone number;*

*display means for displaying the calling party's telephone number inputted from said control means; and*

*said control means comprising:*

*detecting means for detecting the calling party's telephone number in the first signal;*

*display output means for outputting the calling party's telephone detected by the detecting means to the display means;*

*memory output means for outputting the calling party's telephone number detected by the detecting means to the memory means;*

*instantaneous calling means for calling said calling party via said transmitter means and said antenna means by using the calling party's telephone number stored in said memory means if said excitation signal is inputted by an operator to said operator input means within specified period of time; and*

*waiting means to wait for an incoming call if said excitation signal is not inputted by an operator to said operator input means within specified period of time.*

* * * * *